(12) United States Patent
Hu et al.

(10) Patent No.: US 10,386,705 B2
(45) Date of Patent: Aug. 20, 2019

(54) LIGHT EMITTING DEVICE AND PROJECTION DISPLAY APPARATUS

(71) Applicant: APPOTRONICS CORPORATION LIMITED, Shenzhen (CN)

(72) Inventors: Fei Hu, Shenzhen (CN); Zuqiang Guo, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/564,184

(22) PCT Filed: Apr. 6, 2016

(86) PCT No.: PCT/CN2016/078523
§ 371 (c)(1),
(2) Date: Oct. 3, 2017

(87) PCT Pub. No.: WO2016/161932
PCT Pub. Date: Oct. 13, 2016

(65) Prior Publication Data
US 2018/0129124 A1 May 10, 2018

(30) Foreign Application Priority Data
Apr. 9, 2015 (CN) .......................... 2015 1 0165715

(51) Int. Cl.
*G03B 21/00* (2006.01)
*G02B 27/10* (2006.01)
(Continued)

(52) U.S. Cl.
CPC ........... *G03B 21/008* (2013.01); *G02B 27/10* (2013.01); *G03B 21/20* (2013.01); *G03B 21/204* (2013.01); *H04N 9/3114* (2013.01)

(58) Field of Classification Search
CPC ............... G03B 21/204; G03B 21/208; G03B 21/2013; G03B 21/2033; G03B 21/2053;
(Continued)

(56) References Cited

U.S. PATENT DOCUMENTS 7,306,340 B2    12/2007  Nakagawa et al.
9,866,807 B2 *   1/2018  Li ............................ F21V 9/40
(Continued)

FOREIGN PATENT DOCUMENTS

CN    102418905 A    4/2012
CN    202615106 U    12/2012
(Continued)

OTHER PUBLICATIONS

International Search Report in the parent PCT application No. PCT/CN2016/078523, dated Jul. 14, 2016.
(Continued)

*Primary Examiner* — Sultan Chowdhury
(74) *Attorney, Agent, or Firm* — Chen Yoshimura LLP

(57) ABSTRACT

A light emitting device and a projection display apparatus. The light emitting device comprises: an excitation light source (11), used for emitting excitation light; a compensation light source (12), used for emitting compensation light having a spectral range different from that of the excitation light; and a wavelength conversion device (13), disposed in a transmission path of the excitation light and the compensation light and used for outputting sequential light under alternate irradiation of the excitation light source (11) and the compensation light source (12), the sequential light comprising at least one type of excited light and the compensation light. The compensation light has spectral overlap with at least one type of excited light in the at least one type
(Continued)

of excited light, so as to greatly improve the brightness of the light emitting device and the utilization efficiency of light in the light emitting device.

19 Claims, 12 Drawing Sheets

(51) Int. Cl.
*G03B 21/20* (2006.01)
*H04N 9/31* (2006.01)

(58) Field of Classification Search
CPC .. H04N 9/3111; H04N 9/3114; H04N 9/3158; H04N 9/3161; H04N 9/3164; H04N 9/3182
See application file for complete search history.

(56) References Cited

U.S. PATENT DOCUMENTS

| | | |
|---|---|---|
| 2006/0139578 A1 | 6/2006 | Nakagawa et al. |
| 2010/0328554 A1* | 12/2010 | Shibasaki ............ G03B 21/204 348/760 |
| 2011/0043765 A1 | 2/2011 | Shibasaki |
| 2011/0096297 A1 | 4/2011 | Ogino et al. |
| 2012/0026472 A1 | 2/2012 | Masuda |
| 2012/0262677 A1 | 10/2012 | Ogino et al. |
| 2012/0320109 A1 | 12/2012 | Shibasaki |
| 2013/0077056 A1* | 3/2013 | Okuda ................. H04N 9/3105 353/31 |
| 2013/0258639 A1* | 10/2013 | Hu ........................... F21V 9/40 362/84 |
| 2014/0029237 A1 | 1/2014 | Mehl |
| 2014/0340649 A1* | 11/2014 | Takahashi ............ G03B 21/204 353/31 |
| 2014/0347634 A1* | 11/2014 | Bommerbach ...... H04N 9/3158 353/31 |
| 2016/0026076 A1 | 1/2016 | Hu |

FOREIGN PATENT DOCUMENTS

| | | |
|---|---|---|
| CN | 103809350 A | 5/2014 |
| CN | 104020633 A | 9/2014 |
| CN | 203930219 U | 11/2014 |
| CN | 204595411 U | 8/2015 |
| JP | 2011-043719 A | 3/2011 |
| JP | 2011-095388 A | 5/2011 |
| JP | 2012-032634 A | 2/2012 |

OTHER PUBLICATIONS

IPRP in the parent PCT application No. PCT/CN2016/078523, dated Oct. 10, 2017.
Chinese Search Report dated Aug. 9, 2017, in a counterpart Chinese patent application, No. CN 201510165715.7.
Chinese Search Report dated Mar. 11, 2018 in a counterpart Chinese patent application, No. CN 201510165715.7.
Chinese Office Action, dated Jun. 26, 2018, , in a counterpart Chinese patent application, No. CN 201510165715.7.
Supplementary European Search Report, dated Oct. 23, 2018 in corresponding application EP 160776107.1.
Japanese Office Action, dated Sep. 25, 2018 in a counterpart Japanese patent application, No. JP 2017-552438.

* cited by examiner

LIGHT EMITTING DEVICE AND PROJECTION DISPLAY APPARATUS

BACKGROUND OF THE INVENTION

Field of the Invention

This invention relates to optical technologies, and in particular, it relates to light emitting devices and projection apparatus.

Description of Related Art

Current technologies provide light emitting devices for projection display systems, which produce lights or different primary colors by using a semiconductor laser to generate an excitation light, to excite different wavelength conversion material segments on a wavelength conversion device. Such light emitting devices have the advantages of high efficiency and low etendue, and are rapidly gaining wide use. They have become ideal choices for light emitting devices for projection display systems. In single chip DMD (digital micromirror device) projection systems, a blue laser light is typically used as the excitation light to excite a segmented color wheel to generate a time sequence of red, green and blue lights, thereby providing the three primary color lights required for projection systems. The blue light is obtained using scattering power to remove the coherency of the laser light. The green light is obtained by exciting a green phosphor material with the blue light, and the red light is obtained by exciting an orange or yellow phosphor material with the blue light and then using a corresponding filter to filter out the shorter wavelength components.

SUMMARY

Problem to be Solved

In the above light emitting devices for projection systems, the light utilization efficiencies of green and blue lights are relatively high and can achieve satisfactory brightness, but the wavelength conversion efficiency of orange or yellow phosphor materials are relatively low, and the efficiency for obtaining the red light is even lower after using the filter. Also, the color coordinates of the red light is different from the standard gamut defined by the REC.709 or DCI (Digital Copyright Identifier) standards. As a result, the portion of the brightness of the red light in the total brightness of the projection system is low, and the saturation of the red light is low. In applications that require high image quality, such as playing video, laser television, which have high requirement for the brightness ratio and saturation of the red light, using the above described light emitting devices will result in low image quality.

To address the above problem, it is possible to additionally filter the red light so that its color coordinates meet the standard gamut requirement, but the brightness and light utilization efficiency of the red light will be further reduced. Thus, the brightness and color saturation for the red light are difficult to reconcile. For green fluorescent light, because the light conversion efficiency is relatively high, typically there is no problem with brightness. However, because the spectral range of green fluorescent light is relatively broad, its color saturation is low. Therefore, typically the longer wavelength portion of the spectrum needs to be filtered out so that its color coordinates can meet the REC.709 and DCI standards. This causes lower utilization efficiency for the green light.

To further address the above problems, the above described light emitting device for projection system may be improved by adding laser lights, and combining the laser lights with the fluorescent lights, so that the fluorescence efficiency, brightness and color coordinates can all be improved, and the speckle of the laser light is also within acceptable ranges. This provides a feasible solution.

Take the example of red light compensation. For a transmission type color wheel, the blue laser light and the red laser light may be combined into one beam, and when the color wheel is rotated to a position where the orange phosphor segment is illuminated, the blue laser and red laser are simultaneously turned on. At this time, the blue laser light excites the orange phosphor to generate an orange fluorescent light; the red laser light also illuminates the orange phosphor, however it does not excite the phosphor, and is only scattered by it. The orange fluorescent light and the red laser light are combined based on etendue, and output from the color wheel to the collection lens to be collected. Using this design, the coating on the input side of the transmission type color wheel is required to transmit blue light and red light. This type of coating is more difficult to make compared to coatings that are only required to transmit blue light. Moreover, because the red laser light is scattered by the orange phosphor, a part of the light is back-scattered and passes through the coating and is lost. Also, a part of the orange light generated from the blue excitation light is also incident on the coating, and because of their large incident angles, the spectral characteristic curve of the coating shift, so that a part of the orange light within the desired spectral range is also lost due to transmission, which results in lower efficiency for the red light output.

For a reflection type color wheel, the blue laser light and the red laser light may be combined into one beam, passed through a partially coated filter, then collected by a collection lens and focused on the orange phosphor segment of the color wheel. The red laser light is incident on the orange phosphor, is scattered by it, and then reflected by the reflective layer at the bottom of the phosphor layer. This process causes a certain loss. Also, because the reflected light output from the color wheel has a Lambertian distribution, there is a certain loss when the light is collected by the collection lens. Moreover, when the light is passed through the partially coated filter, there is another loss at the filter. For all these reasons, the utilization efficiency of the red laser light is reduced, and the efficiency of the red phosphor is also lower. Because the cost of red laser is relatively high, its low utilization efficiency will increase the cost of the entire system. This is disadvantageous to product manufacturing and application. Therefore, because of all of the factures discussed above, there is a need for a high efficiency light combination system that combines fluorescent light and red laser light.

Technical Solutions

In light of the above, embodiments of the present invention provides a light emitting device and a projection system, to solve the problem in the conventional technology that when the laser light and the fluorescent light are combined, the utilization efficiencies of both the laser light and the fluorescent light are low.

In one aspect, the present invention provides a light emitting device, which includes:

an excitation light source for generating an excitation light;

a compensation light source for generating a compensation light having a spectral range different from a spectral range of the excitation light; and a wavelength conversion device, disposed on transmission paths of the excitation light and the compensation light, wherein the wavelength conversion device outputs a light sequence under alternating illumination of the excitation light source and the compensation light source, the light sequence including at least one converted light and the compensation light, wherein the compensation light has spectral overlap with at least one converted light of the at least one converted light.

Preferably, the wavelength conversion device includes at least two segments arranged along a circumferential direction, wherein at least one of the at least two segments includes a first diffuser, and at least one of remaining ones of the at least two segments includes a wavelength conversion layer.

Preferably, at least one of the at least two segments includes a second diffuser.

Preferably, the wavelength conversion device is a transmission type wavelength conversion device, a reflection type wavelength conversion device, or a wavelength conversion device that includes both a transmission region and a reflection region.

Preferably, the wavelength conversion device is one that includes both the transmission region and the reflection region, the segment having the first diffuser is located in the transmission region of the wavelength conversion device.

Preferably, the compensation light source includes a first compensation light source generating a first compensation light, wherein the wavelength conversion layer includes a first wavelength conversion layer which generates a first converted light when illuminated by the excitation light, wherein the light sequence includes the first compensation light and the first converted light, and wherein the first compensation light has spectral overlap with the first converted light.

Preferably, the first compensation light source is turned on when the at least one segment of the wavelength conversion device having the first diffuser is located on a transmission path of the first compensation light source, and is turned off when other segments are located on the transmission path of the first compensation light source; and wherein the excitation light source is turned on when the segment of the wavelength conversion device having the wavelength conversion layer is located on the transmission path of the excitation light source, and is turned off when the segment having the first diffuser is located on the transmission path of the excitation light source.

Preferably, the excitation light source is turned on when the segment of the wavelength conversion device having the second diffuser is located on the transmission path of the excitation light source; or wherein the light emitting device further includes a third light source for generating a third light, wherein the third light has a same color as but a different spectrum than the excitation light, and wherein third light source is turned on when the segment of the wavelength conversion device having the second diffuser is located on the transmission path of the third light source, and is turned off when other segments are located on the transmission path of the third light source.

Preferably, the compensation light source further includes a second compensation light source generating a second compensation light which has a different spectral range than that of the first compensation light, wherein the wavelength conversion layer further includes a second wavelength conversion layer which generates a second converted light when illuminated by the excitation light, the second converted light having a different spectral range than that of the first converted light, wherein the light sequence further includes the second compensation light and the second converted light, and wherein the second compensation light has spectral overlap with the second converted light.

Preferably, the second compensation light source is turned on when the at least one segment of the wavelength conversion device having the first diffuser is located on a transmission path of the second compensation light source, and is turned off when other segments are located on the transmission path of the second compensation light source.

Preferably, the turning-on time sequence of the second compensation light source is different from the turning-on time sequence of the first compensation light source.

In a second aspect, the present invention provides a light emitting device, which includes:

an excitation light source for generating an excitation light;

a compensation light source for generating a compensation light having a spectral range different from a spectral range of the excitation light;

a wavelength conversion device disposed on transmission paths of the excitation light and the compensation light, the wavelength conversion device including at least two segments, wherein when the excitation light source and the compensation light source simultaneously illuminate different segments of the wavelength conversion device, the wavelength conversion device outputs a combined light of the compensation light and a converted light, wherein the compensation light has spectral overlap with the converted light.

In a third aspect, the present invention provides a projection device, including the above light emitting device, and further including a first image forming assembly, wherein the first image forming assembly includes a light relay, a TIR prism, a spatial light modulator, and a projection lens.

In a fourth aspect, the present invention provides a projection device, including the above light emitting device, and further including a second image forming assembly, wherein the second image forming assembly includes a light relay, a TIR prism, a light separation and combination prism, a spatial light modulator including a first digital micromirror device and a second digital micromirror device, and a projection lens;

wherein the light separation and combination prism splits the light from the light emitting device into a light traveling along a first optical path and a light traveling along a second optical path, the first optical path being different from the second optical path, wherein the first digital micromirror device modulates the light traveling along the first optical path to obtain a first image light, wherein the second digital micromirror device modulates the light traveling along the second optical path to obtain a second image light, and wherein the light separation and combination prism combines the first image light and the second image light, and wherein the TIR prism guides the combined light to the projection lens.

Advantages

Comparing to conventional technologies, embodiments of the present invention have the following advantages.

By combining the laser light and converted fluorescent light using time-based light combination, the utilization efficiencies of the laser light and converted light are improved. The brightness of the light emitting device as well as the projection system using the light emitting device is increased, and the cost of the light emitting device and the projection system is greatly reduced.

BRIEF DESCRIPTION OF THE DRAWINGS

To more clearly describe embodiments of the present invention or the conventional technology, the drawings used in to describe the embodiments or conventional technology are briefly described below. These drawings illustrate embodiments of the present invention, and those of ordinary skill in the relevant art can construct other drawings based on the described drawings without creative work.

DETAILED DESCRIPTION OF PREFERRED EMBODIMENTS

Embodiments of the present invention provide a light emitting device, including at least two light sources, and a wavelength conversion device, the at least two light sources including an excitation light source and a compensation light source, wherein:

The excitation light source is used for generating an excitation light;

The compensation light source is used for generating a compensation light having a spectral range different from a spectral range of the excitation light;

The wavelength conversion device is disposed on the transmission path of the excitation light and the compensation light, and outputs a light sequence under alternating illumination of the excitation light source and the compensation light source, the light sequence including at least one converted light and the compensation light, wherein the compensation light has spectral overlap with at least one converted light of the at least one converted light.

Embodiments of the present invention also provide a light emitting device, including:

An excitation light source for generating an excitation light;

A compensation light source for generating a compensation light having a spectral range different from a spectral range of the excitation light;

A wavelength conversion device, which is disposed on the transmission paths of the excitation light and the compensation light, and which includes at least two segments, wherein when the excitation light source and the compensation light source simultaneously illuminate different segments of the wavelength conversion device, the wavelength conversion device outputs a combined light of the compensation light and a converted light, wherein the compensation light has spectral overlap with the converted light.

The key principles of the invention are described above; to further explain the purpose, characteristics and advantages of the invention, specific embodiments of the invention are described in detail below.

Many details are described below for a full understanding of the invention, however the invention may be implemented in other ways. Based on the described embodiments, those of ordinary skill in the art can obtain other embodiments without creative work. The invention is not limited to the embodiments described below.

Further, embodiments of the present invention are described in detail with reference to the drawings; when explaining the embodiments, for ease of explanation, some views of the drawings that illustrate some structural components may be locally enlarged out of scale. These drawings are for illustration only, and do not limit the scope of the invention. Moreover, the actual devices are three dimensional, including length, width and depth.

Embodiments of the invention are described in detail below.

First Embodiment

Figure 1:
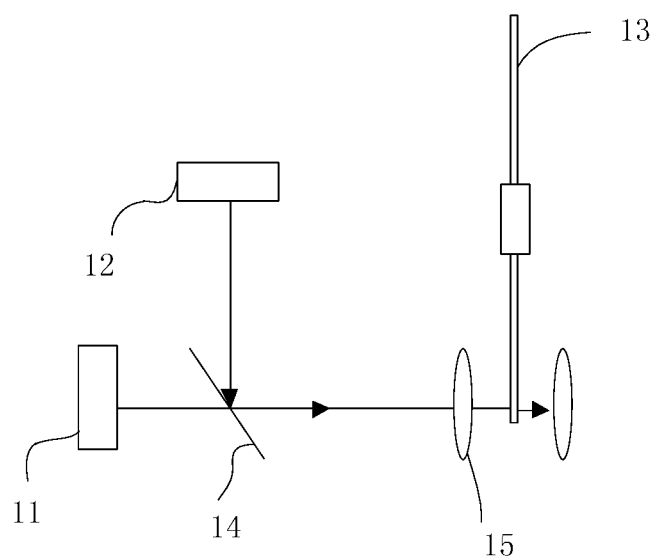
FIG. 1 schematically illustrates the structure of a light emitting device according to a first embodiment of the present invention.

This embodiment provides a light emitting device. As shown in FIG. 1, the light emitting device includes two light sources, which are respectively an excitation light source 11 that emits an excitation light and a compensation light source 12 that emits a compensation light having a spectral range different from that of the excitation light, and a wavelength conversion device 13. The wavelength conversion device 13 is disposed on the transmission path of the excitation light emitted by the excitation light source 11 and the compensation light emitted by the compensation light source 12. The wavelength conversion device 13 outputs a light sequence when alternatingly illuminated by the excitation light source 11 and the compensation light source 12, the light sequence including at least one converted light and the compensation light. The compensation light has spectral overlap with at least one converted light of the at least one converted light.

The excitation light source 11 may be a blue light source, such as a blue laser device or blue light emitting diode or other solid state light emitting devices, or a solid state light emitting device array containing multiple solid state light emitting devices. The blue light source may be one that has a dominant wavelength of 445 nm.

The compensation light source 12 is a laser light source. The compensation light generated by the compensation light source 12 is related to the converted light generated by the wavelength conversion device 13 when illuminated by the excitation light source 11, i.e., the compensation light generated by the compensation light source 12 has spectral overlap with at least one converted light of the at least one converted light generated by the wavelength conversion device 13. For example, when the at least one converted light generated by the wavelength conversion device 13 when illuminated by the excitation light source 11 includes a sequence of green and orange lights, then the compensation light source 12 may be a red laser light source emitting a red laser light which has spectral overlap with the orange light, and/or the compensation light source 12 may be a blueish-green laser light source emitting a blueish-green laser light which has spectral overlap with the green light, etc.

The wavelength conversion device 13 has at least two segments arranged along its movement direction, at least one segment of the at least two segments includes a first diffuser, and at least one of the remaining segments of the at least two segments includes a wavelength conversion layer. The first diffuser is formed by a roughing optical process on the surface of the wavelength conversion device. The wavelength conversion layer absorbs the excitation light and emits a converted light having a different spectral range than the excitation light. The wavelength conversion layer is a layer that contains a wavelength conversion material, the wavelength conversion material including, without limitation, a phosphor power or other materials that can generate a converted light having a different spectral range than the excitation light when excited by the excitation light.

The movement direction of the wavelength conversion device 13 may be a circular movement direction, a horizontal movement direction, or a vertical movement direction. When the wavelength conversion device 13 moves along its movement direction, the at least two segments arranged along the movement direction of the wavelength conversion device 13 are alternatingly disposed in the transmission path of the excitation light source 11 and the compensation light source 12. Each of the excitation light source 11 and the compensation light source 12, respectively, always illuminates a same respective segment of the wavelength conversion device 13 during the periodic movement of the wavelength conversion device 13.

Preferably, at least one segment of the at least two segments of the wavelength conversion device 13 includes a second diffuser. The second diffuser is formed by providing an optical material having a diffusing function on the surface of the wavelength conversion device. The first diffuser, the wavelength conversion layer and the second diffuser are respectively located in different segments of the wavelength conversion device.

The wavelength conversion device 13 outputs a light sequence when alternatingly illuminated by the excitation light source 11 and the compensation light source 12. Specifically, the excitation light source 11 is turn on during the segment of the wavelength conversion device 13 that has the wavelength conversion layer and the segment that has the second diffuser, and turned off during other segments;

the compensation light source 12 is turn on during at least one segment of the wavelength conversion device 13 that has the first diffuser, and turned off during other segments. This way, the wavelength conversion device 13 outputs a light sequence when alternatingly illuminated by the excitation light source 11 and the compensation light source 12.

Figure 2:
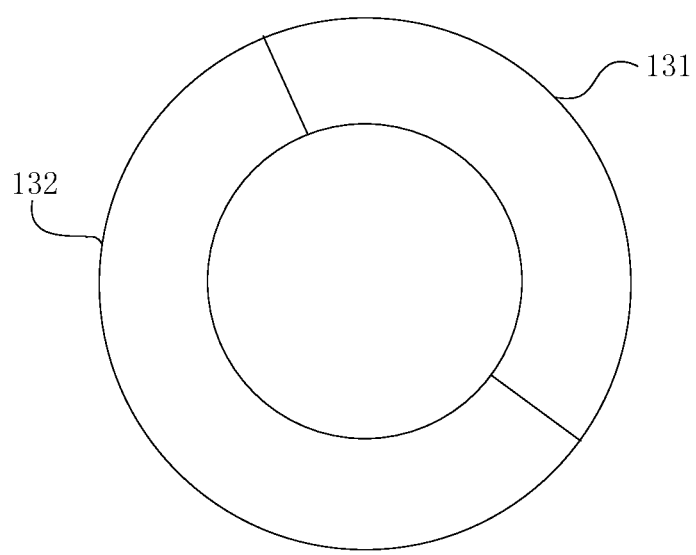
FIG. 2 schematically illustrates the segments of a wavelength conversion device according to an embodiment of the present invention.
Figure 3:
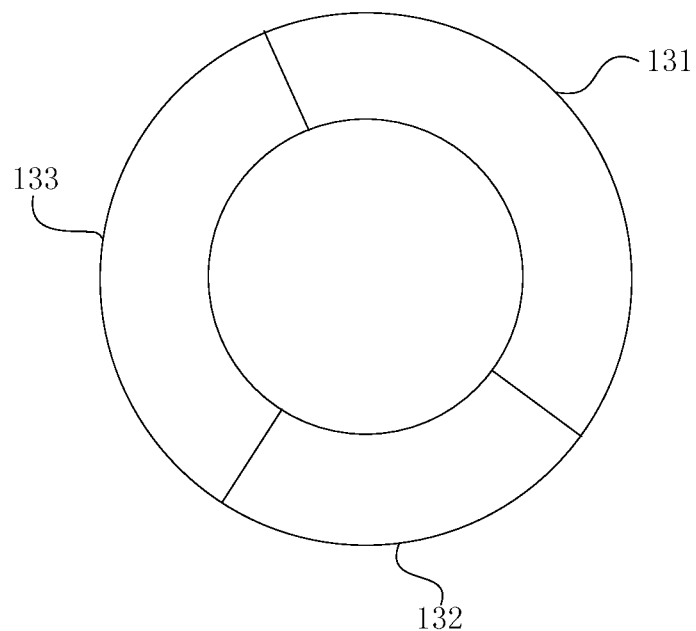
FIG. 3 schematically illustrates the segments of a wavelength conversion device according to another embodiment of the present invention.

Refer to FIGS. 2 and 3, each of which schematically illustrates an arrangement of the segments of the wavelength conversion device 13 of FIG. 1. The arrangement of the segments of the wavelength conversion device 13 is not limited to those shown in FIGS. 2 and 3, and can be any arrangement that meets the following requirements: at least one segment has a first diffuser, and at least one segment has a wavelength conversion layer. Further, when the light emitting device is used in a projection system, preferably, the arrangement of the segments of the wavelength conversion device 13 may be any arrangement that meets the following requirements: at least one segment has a first diffuser, at least one segment has a wavelength conversion layer, and the output light of the light emitting device or the output light of the wavelength conversion device includes three primary color lights.

Refer to FIG. 2, this wavelength conversion device 13 includes, along the circumferential direction, a segment 131 having a first diffuser and a segment 132 having a wavelength conversion layer. The light sequence outputted by the wavelength conversion device 13 when alternatingly illuminated by the excitation light source 11 and the compensation light source 12 includes are least one converted light and the compensation light. More specifically, during the segment 132 of the wavelength conversion device 13 having the wavelength conversion layer, the excitation light source 11 is turned on and the compensation light source 12 is turned off; and during the segment 131 having the first diffuser, the compensation light source 12 is turned on and the excitation light source 11 is turned off. Thus, the wavelength conversion device 13 outputs a light sequence including the converted light and the compensation light. The compensation light has spectral overlap with the converted light generated by the wavelength conversion layer on the segment 132.

Refer to FIG. 3, this wavelength conversion device 13 includes, along the circumferential direction, a segment 131 having a first diffuser, a segment 132 having a wavelength conversion layer, and a segment 133 having a second diffuser. The light sequence outputted by the wavelength conversion device 13 when alternatingly illuminated by the excitation light source 11 and the compensation light source 12 includes at least one converted light, the excitation light, and the compensation light. More specifically, during the segment 132 of the wavelength conversion device 13 having the wavelength conversion layer and the segment 133 having the second diffuser, the excitation light source 11 is turned on and the compensation light source 12 is turned off; and during the segment 131 having the first diffuser, the compensation light source 12 is turned on and the excitation light source 11 is turned off. Thus, the wavelength conversion device 13 outputs a light sequence including the excitation light, the converted light and the compensation light. The compensation light has spectral overlap with the converted light generated by the wavelength conversion layer on the segment 132.

In this embodiment, the wavelength conversion device 13 may be a transmission type wavelength conversion device, a reflection type wavelength conversion device, or a wavelength conversion device that includes both a transmission region and a reflection region. A transmission type wavelength conversion device refers to one where the direction of propagation of the output light is the same as the direction of propagation of the input light. Transmission type wavelength conversion devices may include transmission type color wheels. A reflection type wavelength conversion device refers to one where the direction of propagation of the output light is the opposite of the direction of propagation of the input light. Reflection type wavelength conversion devices may include reflection type color wheels. A wavelength conversion device that includes both a transmission region and a reflection region refers to one where the direction of propagation of a part of the output light is the same as the direction of propagation of the input light, and the direction of propagation of another part of the output light is the opposite of the direction of propagation of the input light.

Preferably, the wavelength conversion device 13 is a transmission type wavelength conversion device, or a wavelength conversion device that includes both a transmission region and a reflection region. When the wavelength conversion device 13 is wavelength conversion device that includes both a transmission region and a reflection region, the segment having the first diffuser is located in the transmission region of the wavelength conversion device 13.

Refer to FIG. 1, which schematically illustrates the structure of a light emitting device employing a transmission type wavelength conversion device according to an embodiment of the present invention. The excitation light source 11 and the compensation light source 12 are disposed on the same side of the transmission type wavelength conversion device 13. The light emitting device further includes a light combination device 14 located on the transmission paths of the excitation light generated by the excitation light source 11 and the compensation light generated by the compensation light source 12. The light combination device 14 combines the excitation light generated by the excitation light source 11 and the compensation light generated by the compensation light source 12 into one light beam, which is then collected by a collection lens 15 to be input to the transmission type wavelength conversion device 13.

Under the alternating illumination of the excitation light source 11 and the compensation light source 12, the transmission type wavelength conversion device 13 outputs a light sequence having a propagates direction that is the same as the input light into the transmission type wavelength conversion device 13. The process of the excitation light source 11 and compensation light source 12 alternatingly illuminating the transmission type wavelength conversion device 13 is as follows:

When the segment of the transmission type wavelength conversion device 13 having the wavelength conversion layer and the segment having the second diffuser are located on the transmission path of the combined light beam from the light combination device 14, the excitation light source 11 is turned on and the compensation light source 12 is turned off. When at least one segment of the transmission type wavelength conversion device 13 having the first diffuser is located on the transmission path of the combined light beam from the light combination device 14, the compensation light source 12 is turned on and the excitation light source 11 is turned off. Thus, the transmission type wavelength conversion device 13 outputs a light sequence of the converted light, the excitation light and the compensation light.

Figure 4:
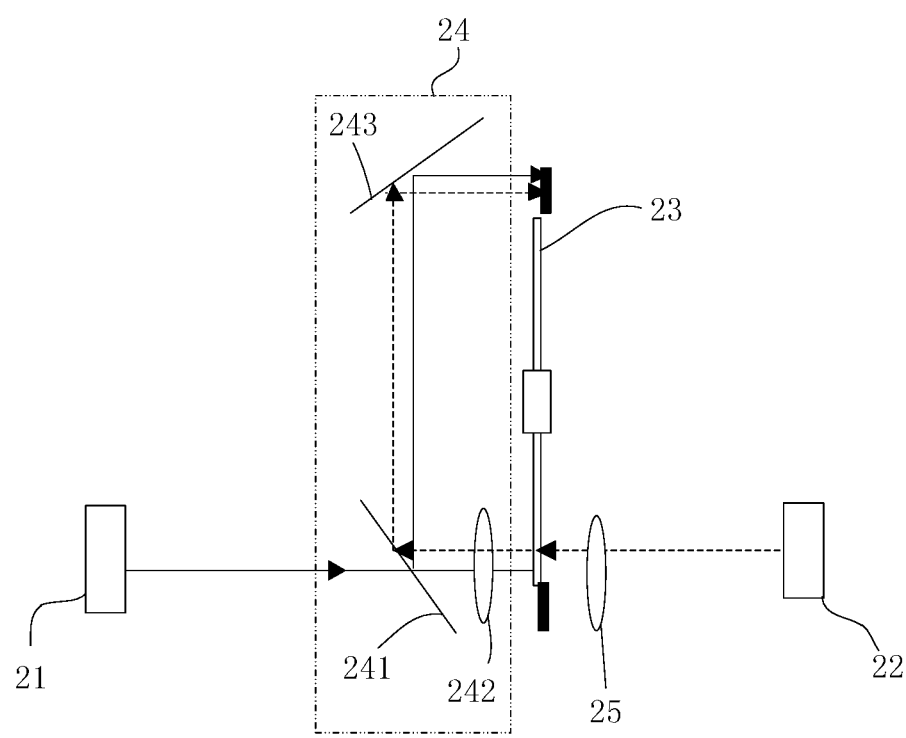
FIG. 4 schematically illustrates the structure of a light emitting device employing a wavelength conversion device that includes both a transmission region and a reflection region according to an embodiment of the present invention.

Refer to FIG. 4, which schematically illustrates the structure of a light emitting device employing a wavelength conversion device that includes both a transmission region and a reflection region according to an embodiment of the present invention. Differences between this light emitting device and the one shown in FIG. 1 lie in the spatial relationship among the laser source, the compensation light source, the wavelength conversion device and the light combination device, and the structure of the light combination device. More specifically:

The excitation light source 21 and the compensation light source 22 are respectively located on different sides of the wavelength conversion device 23 that includes both a transmission region and a reflection region. The light emitting device further includes a light combination device 24 located on the optical path between the excitation light source 21 and the compensation light source 22. The light combination device 24 combines the light generated by the wavelength conversion device 23 when illuminated by the excitation light, and the light generated by the wavelength conversion device 23 when illuminated by the compensation light source 22, into one light beam. The light combination device 24 includes a spectral light splitting plate 241, a collection lens 242 and a reflective plate 243. The excitation light generated by the excitation light source 21 is transmitted through the spectral light splitting plate 241, and then collected by the collection lens 242 to be input to the wavelength conversion device 23. The compensation light generated by the compensation light source 22 is collected by the collection lens 25 to be input to the wavelength conversion device 23. The segment of the wavelength conversion device 23 having the first diffuser is located in the transmission region, and the other segments are located in the reflection region.

Under the alternating illumination of the excitation light source 21 and the compensation light source 22, the wavelength conversion device 23 outputs a light sequence that includes the converted light and the compensation light, or outputs a light sequence that includes the excitation light, the converted light and the compensation light. The propagation directions of the converted light and excitation light outputted from the wavelength conversion device 23 are opposite to the propagation direction of the excitation light inputted into the wavelength conversion device 23, and the propagation direction of the compensation light outputted from the wavelength conversion device 23 is the same as the propagation direction of the compensation light inputted into the wavelength conversion device 23. The process is as follows:

When the segment of the wavelength conversion device 23 having the wavelength conversion layer and the segment having the second diffuser are located on the transmission path of the excitation light, the excitation light source is turned on and the compensation light source is turned off. When the at least one segment of the wavelength conversion device 23 having the first diffuser is located on the transmission path of the compensation light, the compensation light source is turned on and the excitation light source is turned off. The reflection region of the wavelength conversion device 23 reflects the lights generated when illuminated by the excitation light, and the transmission region of the wavelength conversion device 23 transmits the compensation light generated by the compensation light source 22. The reflected lights and the transmitted compensation light are together collected by the collection lens 242 onto the spectral light splitting plate 241, reflected by the spectral light splitting plate 241 to the reflective plate 243, and then reflected by the reflective plate 243 to be output.

In a preferred embodiment, the light emitting device further includes a filter device (not shown in FIG. 4), the filter device being located downstream of the layer structure of the wavelength conversion device that includes the first diffuser and the wavelength conversion layer, or located downstream of the layer structure of the wavelength conversion device that includes the first diffuser, the wavelength conversion layer and the second diffuser. The filter device has the same segment arrangement corresponding to the segments of the wavelength conversion device. The filter device may be a filter plate wheel disposed coaxially with and rotating synchronously with the wavelength conversion device.

In this embodiment, of the segments of the filter plate, the segment that corresponds to the segment of the wavelength conversion device having the first diffuser, and the segment that corresponds to the segment of the wavelength conversion device having the second diffuser, are transmissive in the entire visible spectral range, and the segments that corresponds to the segments of the wavelength conversion device having the wavelength conversion layer have bandpass, high-pass or low-pass characteristics.

Figure 5:
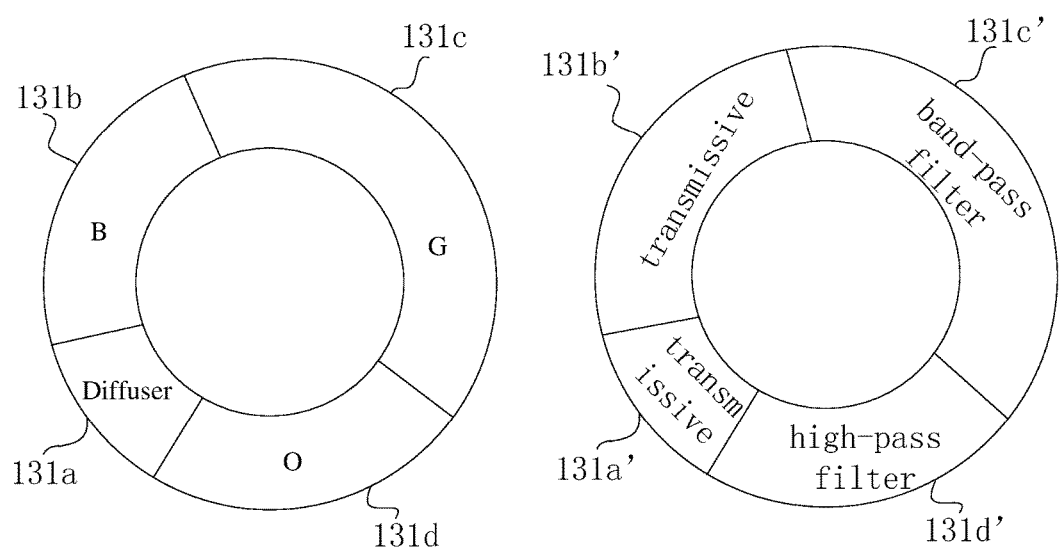
FIG. 5 schematically illustrates a transmission type wavelength conversion device and correspondingly arranged filter device according to an embodiment of the present invention.

When the wavelength conversion device is a transmission type wavelength conversion device, the filter device and the transmission type wavelength conversion device are arranged in a 0 degree correspondence as shown in FIG. 5, i.e., the segments of the filter device and the corresponding segments of the transmission type wavelength conversion device coincide with each other. For example:

Refer to FIG. 5, the segment 131a' of the filter device corresponds with the segment 131a of the transmission type wavelength conversion device having the first diffuser, the segment 131b' of the filter device corresponds with the segment 131b of the transmission type wavelength conversion device having the second diffuser, the segment 131c' of the filter device corresponds with the segment 131c of the transmission type wavelength conversion device having a green wavelength conversion layer, and the segment 131d' of the filter device corresponds with the segment 131d of the transmission type wavelength conversion device having an orange wavelength conversion layer.

Figure 6A:
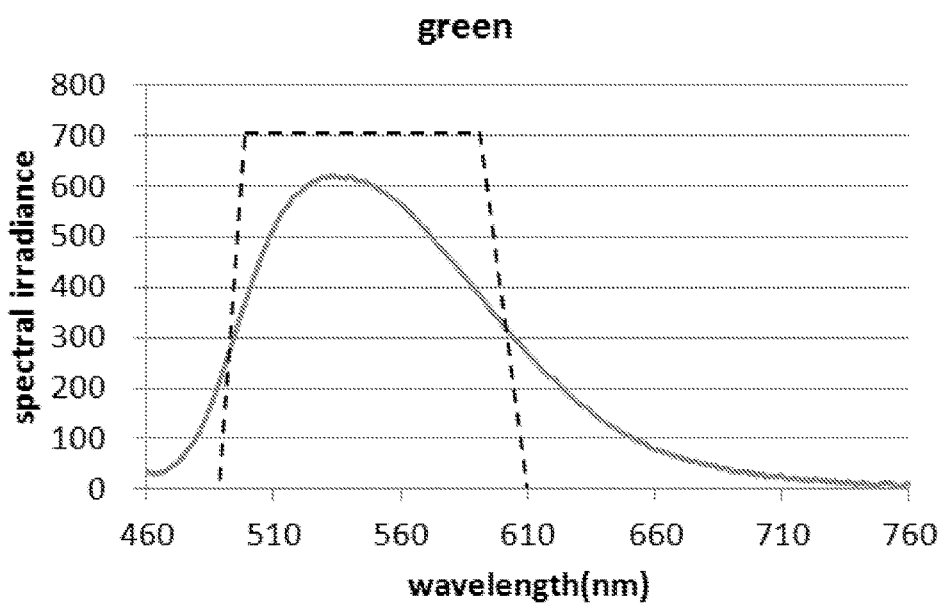
FIGS. 6a and 6b are filter curves of filter devices according to embodiments of the present invention.
Figure 6B:
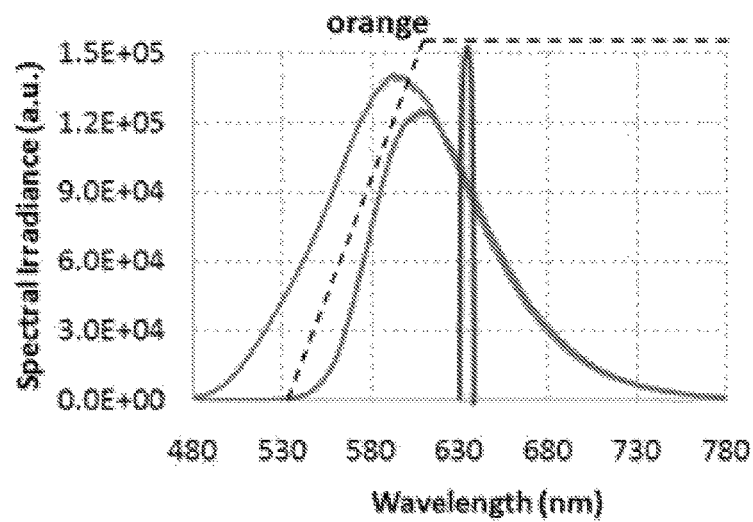

Refer to FIGS. 6a and 6b, which are filter curves of the filter device of the embodiment of FIG. 5. The segments 131a' and 131b' of the filter device are transmissive, the segment 131c' is a band-pass filter as shown in FIG. 6a, and the segment 131d' is a high-pass filter as shown in FIG. 6b.

Figure 7:
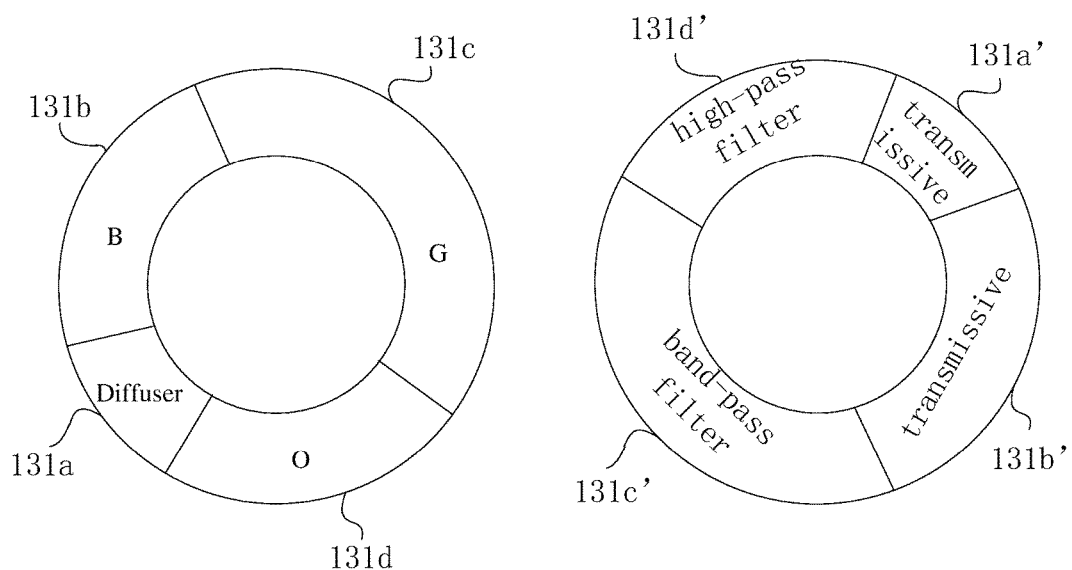
FIG. 7 schematically illustrates a wavelength conversion device that includes both a transmission region and a reflection region and correspondingly arranged filter device according to an embodiment of the present invention.

When the wavelength conversion device is one that includes both a transmission region and a reflection region, the filter device and the wavelength conversion device 23 that includes both a transmission region and a reflection region are arranged in a 180 degree correspondence as shown in FIG. 7. For example:

The segment 131a' of the filter device corresponds with the segment 131a of the wavelength conversion device having the first diffuser, the segment 131b' of the filter device corresponds with the segment 131b of the wavelength conversion device having the second diffuser, the segment 131c' of the filter device corresponds with the segment 131c of the wavelength conversion device having a green wavelength conversion layer, and the segment 131d' of the filter device corresponds with the segment 131d of the wavelength conversion device having an orange wavelength conversion layer. The segments 131a' and 131b' of the filter device are transmissive, the segment 131c' is a band-pass filter as shown in FIG. 6a, and the segment 131d' is a high-pass filter as shown in FIG. 6b.

Second Embodiment

Figure 8:
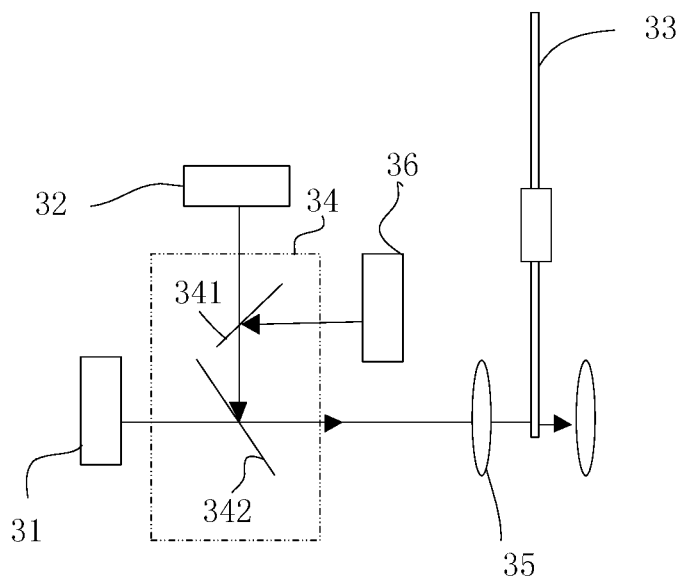
FIG. 8 schematically illustrates the structure of a light emitting device according to a second embodiment of the present invention.

FIG. 8 schematically illustrates the structure of a light emitting device according to another embodiment of the present invention. This light emitting device is based on the one shown in FIG. 1, but a third light source is added, and the light combination device of FIG. 1 is modified correspondingly. The rest of the structure is the same as the light emitting device of FIG. 1.

The third light source 36 emits a third light. The third light has the same color as but different spectrum than the excitation light. For example, when the excitation light is a blue light having a dominant wavelength of 445 nm, the third light may be a blue light having a dominant wavelength of 462 nm. Preferably, the third light source 36 is a laser light source.

Under the alternating illumination of the third light source 36, the excitation light source 31 and the compensation light source 32, the wavelength conversion device 33 generates a light sequence that propagates in the same direction as the excitation light. The light sequence includes the third light, at least one converted light and the compensation light.

Specifically, the third light source 36 is turned on when the segment of the wavelength conversion device 33 having the second diffuser is located on the transmission path of the third light source 36, and turned off when other segments of the wavelength conversion device 33 are located on the transmission path of the third light source 36. The excitation light source 31 is turned on when the segments of the wavelength conversion device 33 having the wavelength conversion layer are located on the transmission path of the excitation light source 31, and turned off when other segments of the wavelength conversion device 33 are located on the transmission path of the excitation light source 31. The compensation light source 32 is turned on when the segment of the wavelength conversion device 33 having the first diffuser is located on the transmission path of the compensation light source 32, and turned off when other segments of the wavelength conversion device 33 are located on the transmission path of the compensation light source 32. Thus, the wavelength conversion device 33 outputs the light sequence which propagates in the same direction as the excitation light and which includes the third light, the at least one converted light and the compensation light.

Specifically, the light combination device 34 includes a first light combination device 341 and a second light combination device 342. The first light combination device 341 is located on the transmission paths of the compensation light generated by the compensation light source 32 and the third light generated by the third light source 36, for combining the compensation light generated by the compensation light source and the third light generated by the third light source 36 into one light beam. The second light combination device 342 is located on the transmission paths of the combined light of the first light combination device 341 and the excitation light generated by the excitation light source 31, for combining the combined light of the first light combination device 341 and the excitation light generated by the excitation light source 31 into one light beam. The combined light from the second light combination device 342 is collected by a collection lens 35 and inputted to the wavelength conversion device 33. Other aspects of this embodiment not described in detail are similar to those of the light emitting device of FIG. 1.

In this embodiment, by using the excitation light source and the third light source that emits a light having the same color but different spectrum as the excitation light, the third light emitted by the third light source can be used as one of the primary colors of the light emitting device, so that the color coordinates of the primary color lights generated by the light emitting device can be closer to the standard color coordinates of the REC.709 and DCI standards.

Third Embodiment

Figure 9:
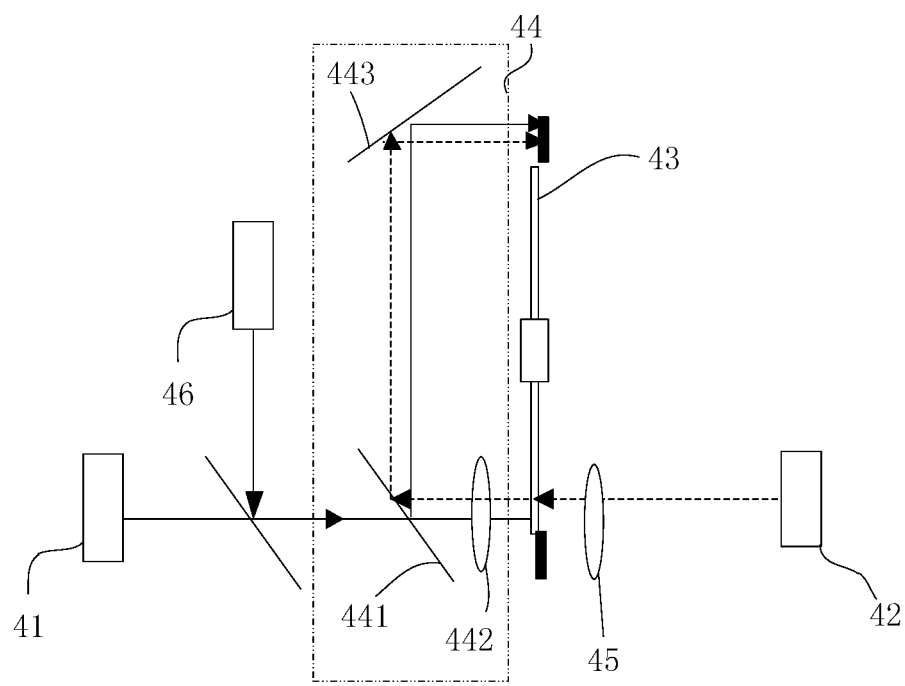
FIG. 9 schematically illustrates the structure of a light emitting device according to a third embodiment of the present invention.

FIG. 9 schematically illustrates the structure of a light emitting device according to another embodiment of the present invention. This light emitting device is based on the one shown in FIG. 4, but a third light source is added. The light from the third light source and the light from the excitation light source 41 propagate along the same optical path or are combined into one beam, and then inputted into the wavelength conversion device 43 via the light combination device 44. The rest of the structure is the same as in the light emitting device of FIG. 4. Other aspects of this embodiment not described in detail are similar to those of the light emitting device of FIG. 4.

The third light source 46 emits a third light. The third light has the same color as but different spectrum than the excitation light. For example, when the excitation light is a blue light having a dominant wavelength of 445 nm, the third light may be a blue light having a dominant wavelength of 462 nm. Preferably, the third light source 46 is a laser light source.

Under the alternating illumination of the third light source 46, the excitation light source 41 and the compensation light source 42, the wavelength conversion device 43 generates a light sequence that propagates in the opposite direction as the excitation light, which is output via the light combination device 44. The light sequence includes the third light, at least one converted light and the compensation light.

Specifically, the third light source 46 is turned on when the segment of the wavelength conversion device 43 having the second diffuser is located on the transmission path of the third light source 46, and turned off when other segments of the wavelength conversion device 43 are located on the transmission path of the third light source 46. The excitation light source 41 is turned on when the segments of the wavelength conversion device 43 having the wavelength conversion layer are located on the transmission path of the excitation light source 41, and turned off when other segments of the wavelength conversion device 43 are located on the transmission path of the excitation light source 41. The compensation light source 42 is turned on when the segment of the wavelength conversion device 43 having the first diffuser is located on the transmission path of the compensation light source 42, and turned off when other segments of the wavelength conversion device 43 are located on the transmission path of the compensation light source 42. Thus, the wavelength conversion device 43 outputs the light sequence which propagates in the opposite direction as the excitation light. The light sequence is relayed by the collection lens 442 of the light combination device 44 onto the spectral light splitting plate 441, reflected by the spectral light splitting plate 441 to the reflective plate 443, and then reflected by the reflective plate 443 to be output.

Fourth Embodiment

The light emitting device of this embodiment is based on the first to third embodiments with modifications; aspects of this embodiment not specifically described are similar to those of the first to third embodiments. The compensation light source of the light emitting device of this embodiment includes a first compensation light source emitting a first compensation light. The wavelength conversion device includes a segment having a first diffuser, a segment having a first wavelength conversion layer that generates a first converted light when illuminated by the excitation light, and a segment having the second diffuser, arranged along the circumferential direction. Under the alternating illumination of the excitation light source and the first compensation light source, the wavelength conversion device outputs a light sequence that includes the excitation light, the first converted light and the first compensation light. The first compensation light has spectral overlap with the first converted light.

The first compensation light source is turned on when the segment of the wavelength conversion device having the first diffuser is located on the transmission path of the first compensation light source, and is turned off when the other segments of the wavelength conversion device are located on the transmission path of the first compensation light source.

The excitation light source is turned on when the segment of the wavelength conversion device having the wavelength conversion layer and the segment having the second diffuser are located on the transmission path of the excitation light source, and is turned off when the other segments of the wavelength conversion device are located on the transmission path of the excitation light source.

Preferably, the light emitting device further includes a third light source emitting a third light; under the alternating illumination of the third light source, the excitation light source and the first compensation light source, the wavelength conversion device outputs a light sequence that includes the third light, the first converted light and the first compensation light. The third light has the same color as but different spectrum than the excitation light. The third light source is similar to the third light source in the second or third embodiment, and will not be described in detail here.

Preferable, the first compensation light source is a red laser source, and the first wavelength conversion layer is an orange wavelength conversion layer; or, the first compensation light source is a blueish-green laser source, and the first wavelength conversion layer is a green wavelength conversion layer. More preferably, the wavelength conversion device includes a segment having the orange wavelength conversion layer and a segment having the green wavelength conversion layer.

Fifth Embodiment

Figure 10:
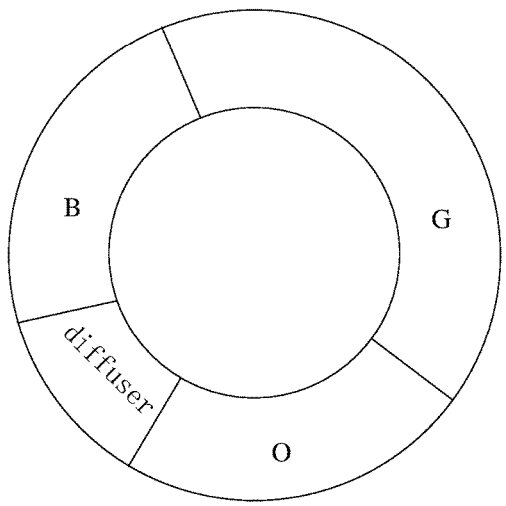
FIG. 10 schematically illustrates the arrangement of segments of a wavelength conversion device according to an embodiment of the present invention.

FIG. 10 schematically illustrates the arrangement of segments of the wavelength conversion device used in the fourth embodiment above. The first wavelength conversion layer is the orange wavelength conversion layer or the green wavelength conversion layer.

The wavelength conversion device includes four segments arranged along the circumferential direction, which are respectively a segment having the second diffuser (the blue segment B in FIG. 10), a segment having the green wavelength conversion layer (the green segment G in FIG. 10), a segment having the orange wavelength conversion layer (the orange segment O in FIG. 10), and the segment having the first diffuser (the diffuser segment in FIG. 10). The segment having the second diffuser scatters the light incident on it, for example, it scatters the excitation light incident on it. The segment having the green wavelength conversion layer convers the light incident on it to a green light, for example, it convers the excitation light incident on it to the green light. The segment having the orange wavelength conversion layer convers the light incident on it to a orange light, for example, it convers the excitation light incident on it to the orange light. The segment having the first diffuser scatters the light incident on it, for example, it scatters the compensation light incident on it.

Figure 11:
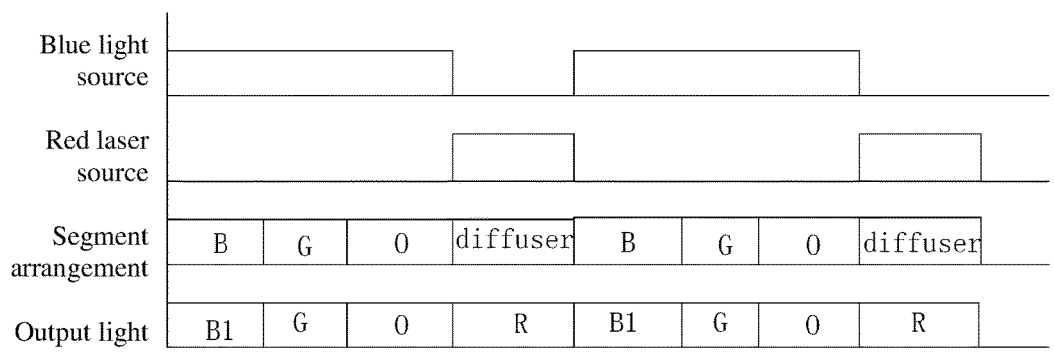
FIG. 11 illustrates a timing of the light source on and off, an arrangement of segments of a wavelength conversion device, and the light sequence of the output light of the wavelength conversion device according to an embodiment of the present invention that uses the wavelength conversion device shown in FIG. 10.

In one example, the arrangement of segments of the wavelength conversion device is as shown in FIG. 10, and the light emitting device includes the excitation light source and the first compensation light source, where the excitation light source is a blue light source emitting a blue light B1, and the compensation light source is a red laser light source emitting a red laser light R. Refer to FIG. 11, which illustrates a timing of the turning on and off of the excitation light source and the red laser source, the arrangement of the segments of the wavelength conversion device, and the light sequence of the output light of the wavelength conversion device. The wavelength conversion device is alternatingly illuminated by the blue light source and the red laser source. The blue light source is turn on when the segment of the wavelength conversion device having the second diffuser (the blue segment B in FIG. 10), the segment having the green wavelength conversion layer (the green segment G in FIG. 10), and the segment having the orange wavelength conversion layer (the orange segment O in FIG. 10) are located on the transmission path of the blue light generated by the blue light source, and is turned off when other segments of the wavelength conversion device are located on the transmission path of the blue light generated by the blue light source. The red laser source is turn on when the segment having the first diffuser (the diffuser segment in FIG. 10) is located on the transmission path of the red laser source, and is turned off when other segments of the wavelength conversion device are located on the transmission path of the red laser source. Thus, the light sequence output by the wavelength conversion device includes the blue light B1, green light G, orange light O and red laser light R. The red laser light of the compensation light has spectral overlap with the orange light O of the converted light.

In another example, the excitation light source is a blue light source emitting a blue light, and the compensation light source is a blueish-green laser light source emitting a blueish-green laser light. The wavelength conversion device is alternatingly illuminated by the blue light source and the blueish-green laser source. The blue light source is turn on when the segment of the wavelength conversion device having the second diffuser (the blue segment B in FIG. 10), the segment having the green wavelength conversion layer (the green segment G in FIG. 10), and the segment having the orange wavelength conversion layer (the orange segment O in FIG. 10) are located on the transmission path of the blue light source, and is turned off when other segments of the wavelength conversion device are located on the transmission path of the blue light source. The blueish-green laser source is turn on when the segment having the first diffuser (the diffuser segment in FIG. 10) is located on the transmission path of the blueish-green laser source, and is turned off when other segments of the wavelength conversion device are located on the transmission path of the blueish-green laser source. Thus, the light sequence output by the wavelength conversion device includes the blue light B1, green light G, orange light O and blueish-green laser light C. The blueish-green laser light C has spectral overlap with the green light G of the converted light.

Figure 12:
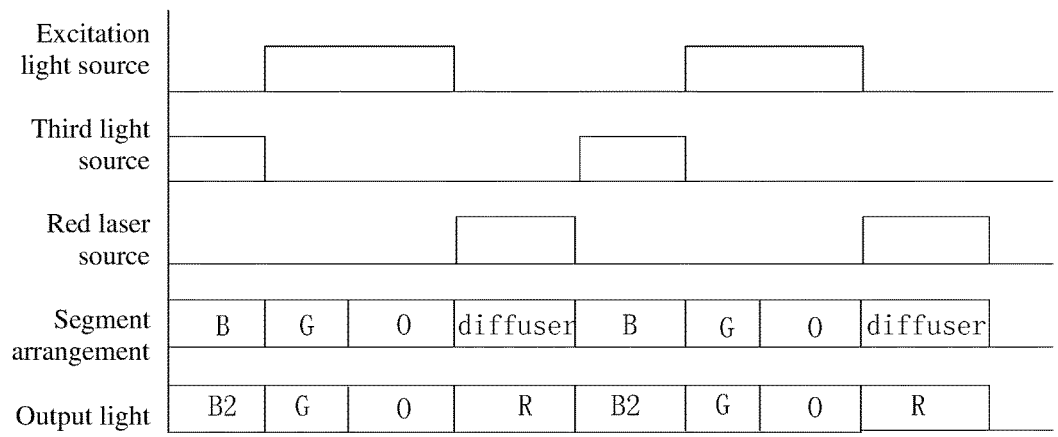
FIG. 12 illustrates a timing of the light source on and off, an arrangement of segments of a wavelength conversion device, and the light sequence of the output light of the wavelength conversion device according to another embodiment of the present invention that uses the wavelength conversion device shown in FIG. 10.

In another example, the light emitting device includes the excitation light source, the first compensation light source and the third light source, where the excitation light source is a blue light source emitting a blue light B1, the first compensation light source is a red laser light source emitting a red laser light R, and the third light source is a blue light source emitting a blue light B2. Refer to FIG. 12, which illustrates a timing of the turning on and off of the excitation light source, the third light source, and the red laser source, the arrangement of the segments of the wavelength conversion device, and the light sequence of the output light of the wavelength conversion device.

The wavelength conversion device is alternatingly illuminated by the blue light source, the third light source, and the red laser source. The third light source is turned on when the segment of the wavelength conversion device having the second diffuser (the blue segment B in FIG. 10) is located on the transmission path of the third light source, and is turned off when other segments of the wavelength conversion device are located on the transmission path of the third light source. The blue light source is turn on when the segment having the green wavelength conversion layer (the green segment G in FIG. 10) and the segment having the orange wavelength conversion layer (the orange segment O in FIG. 10) are located on the transmission path of the blue light source, and is turned off when other segments of the wavelength conversion device are located on the transmission path of the blue light source. The red laser source is turn on when the segment having the first diffuser (the diffuser segment in FIG. 10) is located on the transmission path of the red laser source, and is turned off when other segments of the wavelength conversion device are located on the transmission path of the red laser source. Thus, the light sequence output by the wavelength conversion device includes the blue light B2, green light G, orange light O and red laser light R. The red laser light R has spectral overlap with the orange light O of the converted light.

In this embodiment, the orange converted light and the red laser light are combined by time-based light combination to form the red primary color light, or the green converted light and the blueish-green laser light are combined by time-based light combination to form the green primary color light. Compared to the conventional technology which obtains the red primary color light by directly filtering the orange light, and the conventional technology which obtains the green primary color light by directly filtering the green light generated by the green wavelength conversion layer, the light emitting device of this embodiment of the invention can increase the brightness of the red primary color and the green primary color. Further, the orange light and the red laser light are combined by time-based light combination to form the red primary color light, i.e., the present embodiment obtains the red primary color light by adding the red laser light to the orange light; compared to the conventional technology which directly filters the orange light to form the red primary color light, the present embodiment can adjust the ratio of the added red laser light to adjust the color coordinates of the red primary color light to make it closer to the standard color coordinates, or similarly can adjust the ratio of the added blueish-green laser light to adjust the color coordinates of the green primary color light to make it closer to the standard color coordinates. This reduces the amount of filtered-out orange light or green light, thereby reducing the brightness loss when obtaining the red primary color light or green primary color light. Further, because the orange light and the red light are combined by time-based light combination, or the green light and the blueish-green light are combined using time-based light combination, compared to wavelength-based light combination, the embodiment improves the light utilization efficiency of the red laser light or the blueish-green laser light. Through experiments, it was shown that according to embodiments of the present invention, by time-based light combination of the red laser light and orange light, it can be achieved that when the color coordinates of the red primary color light are (0.163, 0.386), at most 50% of the brightness is lost. In conventional technology where the orange light is directly filtered to obtain the red primary color light, in order to achieve the color coordinates of the red primary color light of (0.163, 0.386), 75% of the brightness will be lost. Based on calculation and experiments, when the red laser light has a dominant wavelength of 638 nm and color coordinates of (0.717, 0.283), if the ratio of the optical powers of the orange light and the red laser light is 1:1, and the brightness ratio of the orange light and the red laser light is 2:1, then the color coordinates of the red primary color light obtained by time-based light combination of the orange light and red laser light are (0.653, 0.346), which meets the requirements of the REC.709 standard. In this case, the brightness of the red primary color light is three times of that obtained by conventional technology which directly uses the orange light with a filter plate.

Sixth Embodiment

Figure 13:
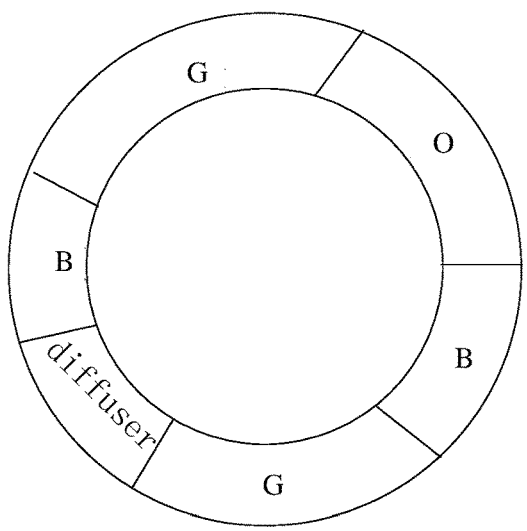
FIG. 13 schematically illustrates the arrangement of segments of a wavelength conversion device according to another embodiment of the present invention.

FIG. 13 schematically illustrates the arrangement of segments of a wavelength conversion device used in the above fourth embodiment, according to another embodiment of the present invention. The first wavelength conversion layer is an orange wavelength conversion layer or a green wavelength conversion layer.

The wavelength conversion device includes six segments arranged along the circumferential direction, which are respectively a segment having the second diffuser (the blue segment B in FIG. 13), a segment having the green wavelength conversion layer (the green segment G in FIG. 13), a segment having the orange wavelength conversion layer (the orange segment O in FIG. 13), another segment having the second diffuser (the other blue segment B in FIG. 13), another segment having the green wavelength conversion layer (the other green segment G in FIG. 13), and the segment having the first diffuser (the diffuser segment in FIG. 13).

Figure 14:
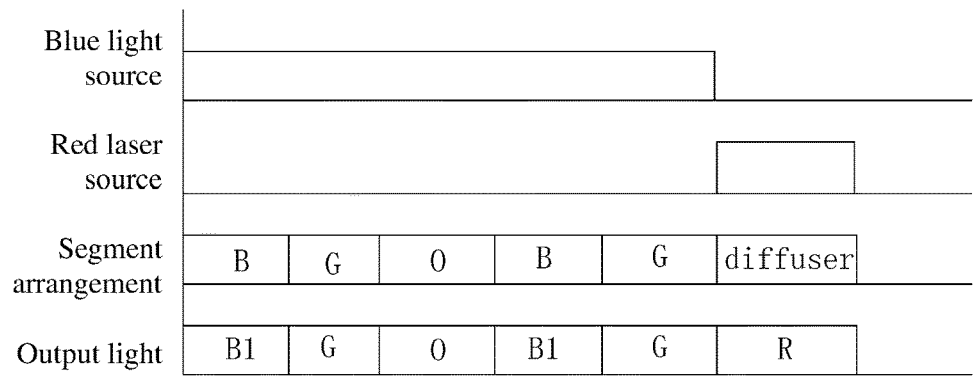
FIG. 14 illustrates a timing of the light source on and off, an arrangement of segments of a wavelength conversion device, and the light sequence of the output light of the wavelength conversion device according to an embodiment of the present invention that uses the wavelength conversion device shown in FIG. 13.

In one example, the arrangement of segments of the wavelength conversion device is as shown in FIG. 13, the excitation light source is a blue light source emitting a blue light B1, and the compensation light source is a red laser light source emitting a red laser light R. Refer to FIG. 14, which illustrates a timing of the turning on and off of the excitation light source and the red laser source, the arrangement of the segments of the wavelength conversion device, and the light sequence of the output light of the wavelength conversion device. The wavelength conversion device is alternatingly illuminated by the blue light source and the red laser source. The blue light source is turn on when the segments of the wavelength conversion device having the second diffuser (the two blue segments B in FIG. 13), the segments having the green wavelength conversion layer (the two green segments G in FIG. 13), and the segment having the orange wavelength conversion layer (the orange segment O in FIG. 13) are located on the transmission path of the blue light source, and is turned off when other segments of the wavelength conversion device are located on the transmission path of the blue light source. The red laser source is turn on when the segment having the first diffuser (the diffuser segment in FIG. 13) is located on the transmission path of the red laser source, and is turned off when other segments of the wavelength conversion device are located on the transmission path of the red laser source. Thus, the light sequence output by the wavelength conversion device includes the blue light B1, green light G, orange light O, blue light B, green light G, and red laser light R. The red laser light of the compensation light has spectral overlap with the orange light O of the converted light.

In this embodiment, the sequence of the light sequence output by the wavelength conversion device is B1GOBGR, so the projection system employing this light emitting device can directly use currently available control program of DDP (DLP data processor) to control the spatial modulator component of the projection system. Thus, it can pass the RGB image data of the source image to be displayed, which is obtained by decoding the Digital Visual Interface (DVI) data, directly to the DDP without requiring any signal conversion.

Seventh Embodiment

Figure 15:
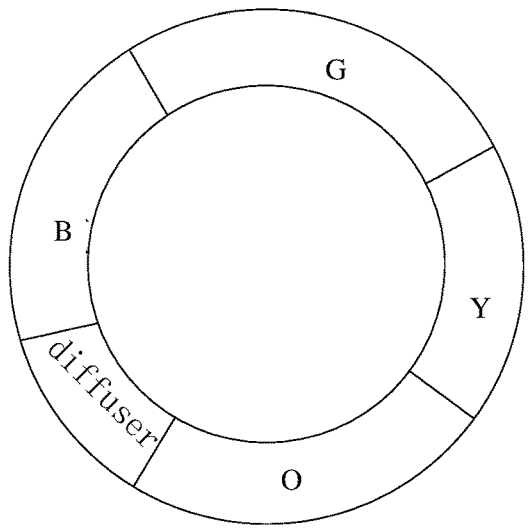
FIG. 15 schematically illustrates the arrangement of segments of a wavelength conversion device according to an embodiment of the present invention.

FIG. 15 schematically illustrates the arrangement of segments of a wavelength conversion device used in the above four embodiments according to another embodiment of the present invention. The first wavelength conversion layer is an orange wavelength conversion layer or a green wavelength conversion layer.

The wavelength conversion device includes five segments arranged along the circumferential direction, which are respectively a segment having the second diffuser (the blue segment B in FIG. 15), a segment having a green wavelength conversion layer (the green segment G in FIG. 15), a segment having a yellow wavelength conversion layer (the yellow segment Y in FIG. 15), a segment having an orange wavelength conversion layer (the orange segment O in FIG. 15), and the segment having the first diffuser (the diffuser segment in FIG. 15).

Figure 16:
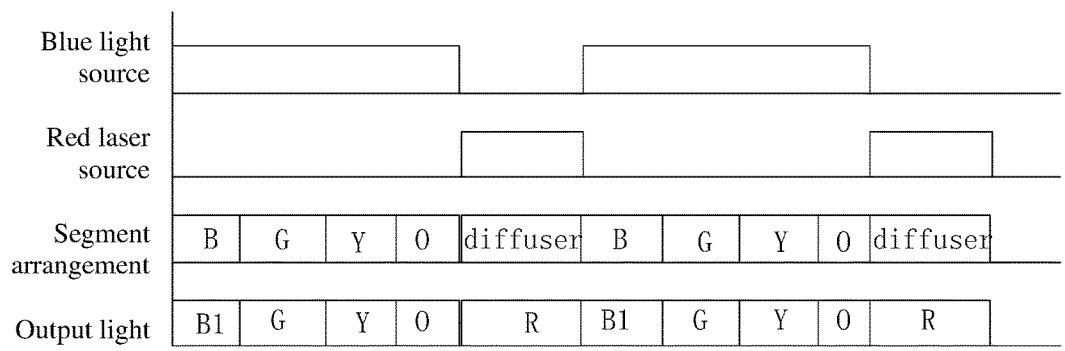
FIG. 16 illustrates a timing of the light source on and off, an arrangement of segments of a wavelength conversion device, and the light sequence of the output light of the wavelength conversion device according to an embodiment of the present invention that uses the wavelength conversion device shown in FIG. 15.

In one example, the arrangement of segments of the wavelength conversion device is as shown in FIG. 15, the excitation light source is a blue light source emitting a blue light B1, and the compensation light source is a red laser light source emitting a red laser light R. Refer to FIG. 16, which illustrates a timing of the turning on and off of the excitation light source and the red laser source, the arrangement of the segments of the wavelength conversion device, and the light sequence of the output light of the wavelength conversion device. The wavelength conversion device is alternatingly illuminated by the blue light source and the red laser source. The blue light source is turn on when the segment of the wavelength conversion device having the second diffuser (the blue segment B in FIG. 15), the segment having the green wavelength conversion layer (the green segment G in FIG. 15), the segment having the yellow wavelength conversion layer (the yellow segment Y in FIG. 15), and the segment having the orange wavelength conversion layer (the orange segment O in FIG. 15) are located on the transmission path of the blue light source, and is turned off when other segments of the wavelength conversion device are located on the transmission path of the blue light source. The red laser source is turn on when the segment having the first diffuser (the diffuser segment in FIG. 15) is located on the transmission path of the red laser source, and is turned off when other segments of the wavelength conversion device are located on the transmission path of the red laser source. Thus, the light sequence output by the wavelength conversion device includes the blue light B1, green light G, yellow light Y, orange light O, and red laser light R.

In this embodiment, because the wavelength conversion device additionally includes the segment having the yellow wavelength conversion layer, the brightness of the light emitting device is increased; also, the yellow light may be used directly or after further processing as one of the primary color lights of the light emitting device, so that the light emitting device can achieve a four-sided color gamut, which enlarges the color gamut and also increases the saturation of the yellow color.

Eighth Embodiment

Figure 17:
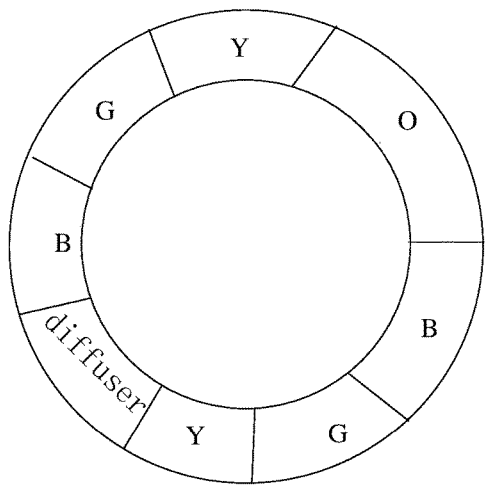
FIG. 17 schematically illustrates the arrangement of segments of a wavelength conversion device according to another embodiment of the present invention.

FIG. 17 schematically illustrates the arrangement of segments of a wavelength conversion device used in the above four embodiments according to another embodiment of the present invention. The first wavelength conversion layer is an orange wavelength conversion layer or a green wavelength conversion layer.

The wavelength conversion device includes eight segments arranged along the circumferential direction, which are respectively a segment having the second diffuser (the blue segment B in FIG. 17), a segment having a green wavelength conversion layer (the green segment G in FIG. 17), a segment having a yellow wavelength conversion layer (the yellow segment Y in FIG. 17), a segment having an orange wavelength conversion layer (the orange segment O in FIG. 17), another segment having the second diffuser (the other blue segment B in FIG. 17), another segment having the green wavelength conversion layer (the other green segment G in FIG. 17), another segment having the yellow wavelength conversion layer (the other yellow segment G in FIG. 17), and the segment having the first diffuser (the diffuser segment in FIG. 17).

Figure 18:
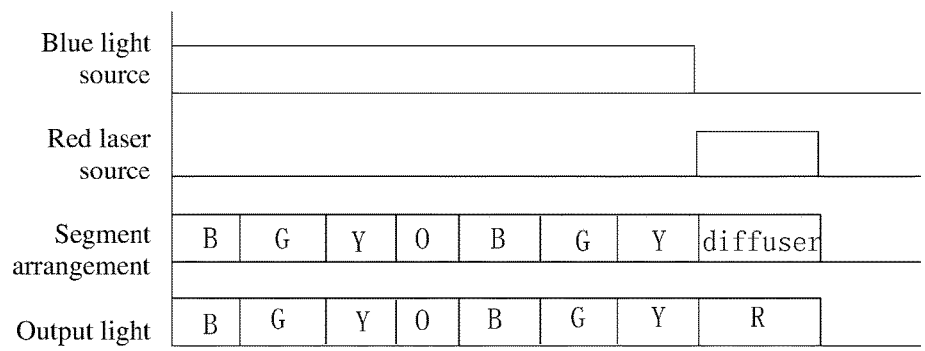
FIG. 18 illustrates a timing of the light source on and off, an arrangement of segments of a wavelength conversion device, and the light sequence of the output light of the wavelength conversion device according to an embodiment of the present invention that uses the wavelength conversion device shown in FIG. 17.

In one example, the arrangement of segments of the wavelength conversion device is as shown in FIG. 17, the excitation light source is a blue light source emitting a blue light B1, and the compensation light source is a red laser light source emitting a red laser light R. Refer to FIG. 18, which illustrates a timing of the turning on and off of the excitation light source and the red laser source, the arrangement of the segments of the wavelength conversion device, and the light sequence of the output light of the wavelength conversion device. The wavelength conversion device is alternatingly illuminated by the blue light source and the red laser source. The blue light source is turn on when the segments of the wavelength conversion device having the second diffuser (the two blue segments B in FIG. 17), the segments having the green wavelength conversion layer (the two green segments G in FIG. 17), the segments having the yellow wavelength conversion layer (the two yellow segment Y in FIG. 17), and the segment having the orange wavelength conversion layer (the orange segment O in FIG. 17) are located on the transmission path of the blue light source, and is turned off when other segments of the wavelength conversion device are located on the transmission path of the blue light source. The red laser source is turn on when the segment having the first diffuser (the diffuser segment in FIG. 17) is located on the transmission path of the red laser source, and is turned off when other segments of the wavelength conversion device are located on the transmission path of the red laser source. Thus, the light sequence output by the wavelength conversion device includes the blue light B1, green light G, yellow light Y, orange light O, blue light B, green light G, yellow light Y, and red laser light R.

In this embodiment, the sequence of the light sequence output by the wavelength conversion device is B1GYOBGYR, so that the projection system employing this light emitting device can directly use currently available control program of DDP to control the spatial modulator component. Thus, it can pass the RGB image data of the source image to be displayed, obtained by decoding the DVI data, directly to the DDP without requiring any signal conversion. Further, because the wavelength conversion device additionally includes segments having the yellow wavelength conversion layer, the brightness of the light emitting device is increased; also, a four-sided color gamut can be achieved, which enlarges the color gamut and also increases the saturation of the yellow color.

Ninth Embodiment

The light emitting device of this embodiment is based on the fourth embodiment with modifications; aspects of this embodiment not specifically described are similar to those of the fourth embodiment. The compensation light source of the light emitting device of this embodiment further includes a second compensation light source emitting a second compensation light which has a different spectral range than the first compensation light. The wavelength conversion device includes, arranged along the circumferential direction, at least two segments each having a first diffuser, a segment having a first wavelength conversion layer that generates a first converted light when illuminated by the excitation light, a segment having the second diffuser, and a segment having a second wavelength conversion layer that generates a second converted light when illuminated by the excitation light. Under the alternating illumination of the excitation light source, the first compensation light source and the second compensation light source, the wavelength conversion device outputs a light sequence that includes the excitation light, the first converted light, the first compensation light, the second converted light and the second compensation light. The first compensation light has spectral overlap with the first converted light, and the second compensation light has spectral overlap with the second converted light.

The first compensation light source is turned on when the at least one segment of the wavelength conversion device having the first diffuser is located on the transmission path of the first compensation light source, and is turned off when the other segments of the wavelength conversion device are located on the transmission path of the first compensation light source.

The second compensation light source is turned on when the at least one segment of the wavelength conversion device having the first diffuser is located on the transmission path of the second compensation light source, and is turned off when the other segments of the wavelength conversion device are located on the transmission path of the second compensation light source. The first compensation light source and the second compensation light source are turned on during different segments.

The excitation light source is turned on when the segments of the wavelength conversion device having the wavelength conversion layer and the segment of the wavelength conversion device having the second diffuser are located on the transmission path of the excitation light source, and is turned off when the segment of the wavelength conversion device having the first diffuser is located on the transmission path of the excitation light source.

Preferably, the light emitting device further includes a third light source emitting a third light; under the alternating illumination of the third light source, the excitation light source, the first compensation light source and the second compensation light source, the wavelength conversion device outputs a light sequence that includes the third light, the first converted light, the first compensation light, the second converted light and the second compensation light. The third light has the same color as but different spectrum than the excitation light. The third light source is similar to the third light source in the second or third embodiment, and will not be described in detail here.

Preferable, the first compensation light source is a red laser source, the first wavelength conversion layer is an orange wavelength conversion layer, the second compensation light source is a blueish-green laser source, and the second wavelength conversion layer is a green wavelength conversion layer.

Tenth Embodiment

Figure 19:
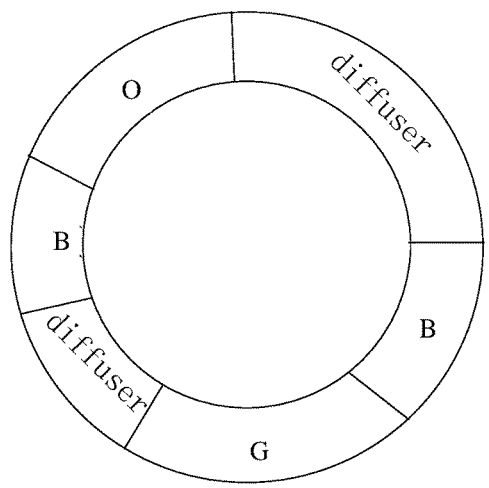
FIG. 19 schematically illustrates the arrangement of segments of a wavelength conversion device according to an embodiment of the present invention.

FIG. 19 schematically illustrates the arrangement of segments of the wavelength conversion device according to the above ninth embodiment. The wavelength conversion device includes six segments arranged along the circumferential direction, which are respectively a segment having the second diffuser (the blue segment B in FIG. 19), a segment having the green wavelength conversion layer (the green segment G in FIG. 19), a segment having the first diffuser (the diffuser segment in FIG. 19), another segment having the second diffuser (the other blue segment B in FIG. 19), a segment having the orange wavelength conversion layer (the orange segment O in FIG. 19), and a segment having the first diffuser (the other diffuser segment in FIG. 19).

Figure 20:
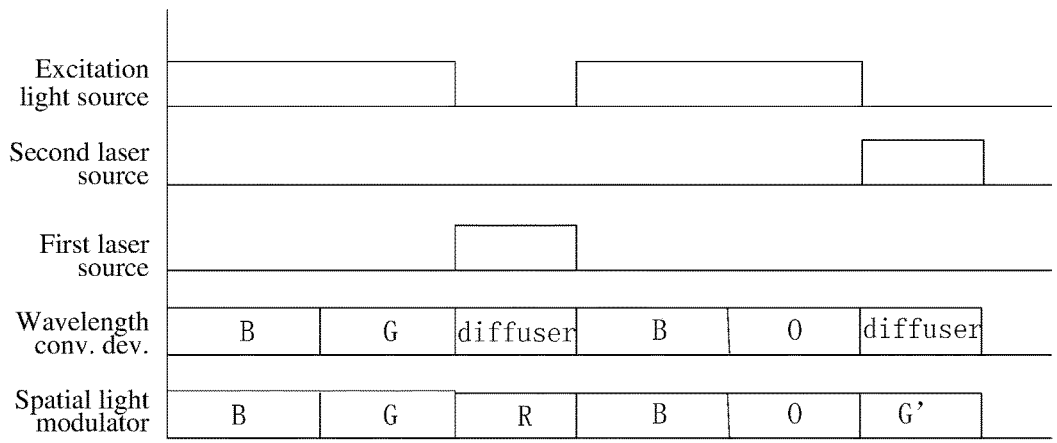
FIG. 20 illustrates a timing of the light source on and off, an arrangement of segments of a wavelength conversion device, and the light sequence of the output light of the wavelength conversion device according to an embodiment of the present invention that uses the wavelength conversion device shown in FIG. 19.

In one example, the arrangement of segments of the wavelength conversion device is as shown in FIG. 19, and the light emitting device includes the excitation light source, the first compensation light source and the second compensation light source, where the excitation light source is a blue light source emitting a blue light B1, the first compensation light source is a red laser light source emitting a red laser light R, and the second compensation light source is a blueish-green laser light source emitting a blueish-green laser light. Refer to FIG. 20, which illustrates a timing of the turning on and off of the excitation light source, the red laser source and the blueish-green laser source, the arrangement of the segments of the wavelength conversion device, and the light sequence of the output light of the wavelength conversion device.

The wavelength conversion device is alternatingly illuminated by the blue light source, the red laser source and the blueish-green laser source. The blue light source is turn on when the segments of the wavelength conversion device having the second diffuser (the two blue segments B in FIG. 19), the segment having the green wavelength conversion layer (the green segment G in FIG. 19), and the segment having the orange wavelength conversion layer (the orange segment O in FIG. 19) are located on the transmission path of the blue light source, and is turned off when other segments of the wavelength conversion device are located on the transmission path of the blue light source. The red laser source is turn on when one of the segments having the first diffuser (one of the diffuser segments in FIG. 19) is located on the transmission path of the red laser source, and is turned off when other segments of the wavelength conversion device are located on the transmission path of the red laser source. The blueish-green laser source is turn on when another segment having the first diffuser (the other diffuser segments in FIG. 19) is located on the transmission path of the blueish-green laser source, and is turned off when other segments of the wavelength conversion device are located on the transmission path of the blueish-green laser source. Thus, the light sequence output by the wavelength conversion device includes the blue light B1, orange light O, blueish-green light C, blue light B1, green light G, and red laser light R. The red laser light R has spectral overlap with the orange light O of the converted light, and the blueish-green laser light C has spectral overlap with the green light G of the converted light.

In another example, the light emitting device includes the third light source, the excitation light source, the first compensation light source and the second compensation light source, where the third light source is a blue light source emitting a blue light B2, the excitation light source is a blue light source emitting a blue light B1, the first compensation light source is a red laser light source emitting a red laser light R, and the second compensation light source is a blueish-green laser light source emitting a blueish-green laser light. The wavelength conversion device is alternatingly illuminated by the third light source, the blue light source, the red laser light source and the blueish-green laser light source. The third light source is turned on when the segments of the wavelength conversion device having the second diffuser (the two blue segment B in FIG. 19) is located on the transmission path of the third light source, and is turned off when other segments of the wavelength conversion device are located on the transmission path of the third light source. The blue light source is turn on when the segment having the green wavelength conversion layer (the green segment G in FIG. 19) and the segment having the orange wavelength conversion layer (the orange segment O in FIG. 19) are located on the transmission path of the blue light source, and is turned off when other segments of the wavelength conversion device are located on the transmission path of the blue light source. The red laser source is turn on when one of the segments having the first diffuser (one of the diffuser segments in FIG. 19) is located on the transmission path of the red laser source, and is turned off when other segments of the wavelength conversion device are located on the transmission path of the red laser source. The blueish-green laser source is turn on when another segment having the first diffuser (the other diffuser segment in FIG. 19) is located on the transmission path of the blueish-green laser source, and is turned off when other segments of the wavelength conversion device are located on the transmission path of the blueish-green laser source. Thus, the light sequence output by the wavelength conversion device includes the blue light B2, orange light O, blueish-green light C, blue light B1, green light G, and red laser light R. The red laser light R of the compensation light has spectral overlap with the orange light O of the converted light, and the blueish-green laser light C of the compensation light has spectral overlap with the green light G of the converted light.

In this embodiment, two segments of the wavelength conversion device are provided with the first diffuser, and two compensation light sources are provided and each corresponding to a respective diffuser. The two compensation lights are respectively combined using time-based light combination with the two converted lights generated by the two wavelength conversion layers of the wavelength conversion device. This further increases the brightness of the light emitting device.

Eleventh Embodiment

Figure 21:
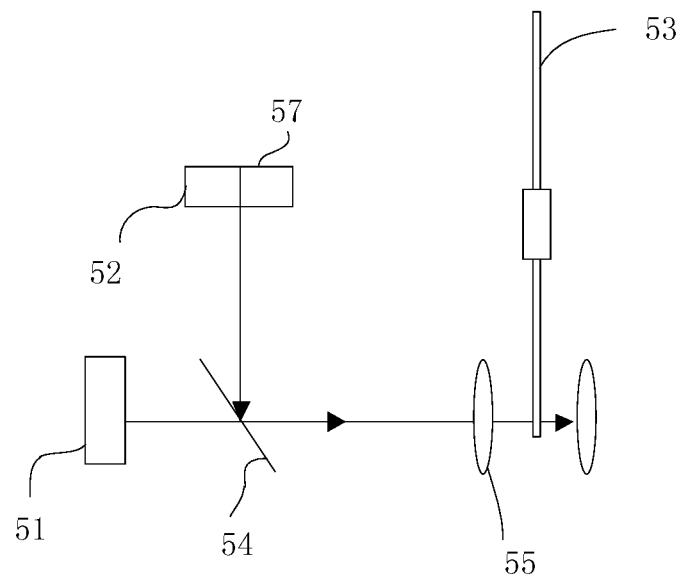
FIG. 21 schematically illustrates the structure of a light emitting device according to a fourth embodiment of the present invention.

FIG. 21 schematically illustrates the structure of a light emitting device according to another embodiment of the present invention. This light emitting device is based on the light emitting device of the ninth embodiment with modifications, and the wavelength conversion device is a transmission type wavelength conversion device. The first compensation light source 52 and the second compensation light source 57 are on the same optical path; for example, the first compensation light source 52 and the second compensation light source 57 are disposed side by side. The light combination device 54 combines the excitation light emitted by the excitation light source 51, the first compensation light emitted by the first compensation light source 52 and the second compensation light emitted by the second compensation light source 57 into one light beam. The combined light beam is collected by the collection lens 55 to be input to the wavelength conversion device 53.

Under the alternating illumination of the excitation light source 51, the first compensation light source 52 and the second compensation light source 57, the transmission type wavelength conversion device 53 outputs a light sequence propagating in the same direction as the light input into the transmission type wavelength conversion device 53. The process of the excitation light source 51, the first compensation light source 52 and the second compensation light source 57 alternatingly illuminating the transmission type wavelength conversion device 53 is as follows:

When the segment of the wavelength conversion device 53 having the wavelength conversion layer and the segment having the second diffuser are located on the transmission path of the combined light from the light combination device 54, the excitation light source 51 is turned on, and the first compensation light source 52 and the second compensation light source 57 are turned off. When at least one of the segments of the wavelength conversion device 53 having the first diffuser is located on the transmission path of the combined light from the light combination device 54, the first compensation light source 52 is turned on, and the excitation light source 51 and the second compensation light source 57 are turned off. When at least another segment of the wavelength conversion device 53 having the first diffuser is located on the transmission path of the combined light from the light combination device 54, the second compensation light source 57 is turned on, and the excitation light source 51 and the first compensation light source 52 are turned off.

In this embodiment, the light emitting device includes the excitation light source, the first compensation light source and the second compensation light source. Or, it includes the third light source, the excitation light source, the first compensation light source and the second compensation light source. Under the alternating illumination of the excitation light source, the first compensation light source and the second compensation light source, the wavelength conversion device outputs a light sequence that includes the excitation light, at least two converted lights, the first compensation light and the second compensation light. Or, under the alternating illumination of the third light source, the excitation light source, the first compensation light source and the second compensation light source, the wavelength conversion device outputs a light sequence that includes the third light, at least two converted lights, the first compensation light and the second compensation light. The first compensation light is combined with one of the converted lights using time-based light combination to form one primary color light, and the second compensation light is combined with the other converted light using time-based light combination to form another primary color light. This can simultaneously increase the utilization efficiencies of the two different converted lights, and increase the brightness of the light emitting device.

Twelfth Embodiment

Figure 22:
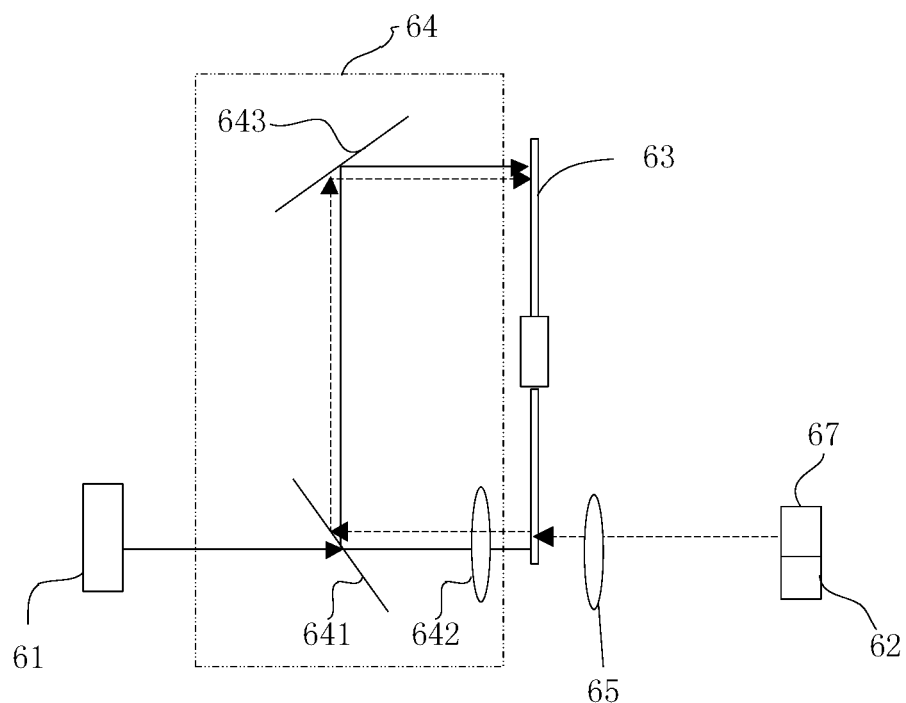
FIG. 22 schematically illustrates the structure of a light emitting device according to a fifth embodiment of the present invention.

FIG. 22 schematically illustrates the structure of a light emitting device according to another embodiment of the present invention. This light emitting device is based on the light emitting device of the ninth embodiment with modifications, and the wavelength conversion device is one that includes both a transmission region and a reflection region. The first compensation light source 62 and the second compensation light source 67 are on the same optical path; for example, the first compensation light source 62 and the second compensation light source 67 are disposed side by side. The light combination device 64 combines the light generated by the wavelength conversion device 63 under illumination of the excitation light source 61, and the light generated by the wavelength conversion device 63 under illumination of the first compensation light source 62, into one light beam. The light combination device 64 includes a spectral light splitting plate 641, a collection lens 642 and a reflective plate 643. The excitation light emitted by the excitation light source 61 is transmitted through the spectral light splitting plate 641, collected by the collection lens 642, and then input to the wavelength conversion device 63. The compensation light emitted by the compensation light source 62 is collected by the collection lens 65 and input to the wavelength conversion device 63. The segment of the wavelength conversion device 63 having the first diffuser is located in the transmission region, and the other segments are located in the reflection region.

Under the alternating illumination of the excitation light source 61, the first compensation light source 62 and the second compensation light source 67, the wavelength conversion device 63 outputs a light sequence propagating in a direction opposite to the excitation light. More specifically:

When the segment of the wavelength conversion device 63 having the wavelength conversion layer and the segment having the second diffuser are located on the transmission path of the excitation light, the excitation light source 61 is turned on, and the first compensation light source 62 and the second compensation light source 67 are turned off. When at least one of the segments of the wavelength conversion device 63 having the first diffuser is located on the transmission path of the first compensation light, the first compensation light source 62 is turned on, and the excitation light source 61 and the second compensation light source 67 are turned off. When at least another segment of the wavelength conversion device 63 having the first diffuser is located on the transmission path of the second compensation light, the second compensation light source 67 is turned on, and the excitation light source 61 and the first compensation light source 62 are turned off. The reflection region of the wavelength conversion device 63 reflects the lights that are generated under illumination of the excitation light. The transmission region of the wavelength conversion device 63 transmits the first compensation light emitted by the first compensation light source 62 and the second compensation light emitted by the second compensation light source 67. The reflected light beam and the transmitted first compensation light and second compensation light from the wavelength conversion device 63 are together collected by the collection lens 642 and input onto the spectral light splitting plate 641, reflected by the spectral light splitting plate 641 to the reflective plate 643, and then reflected by the reflective plate 643 to be output.

Thirteenth Embodiment

Figure 23:
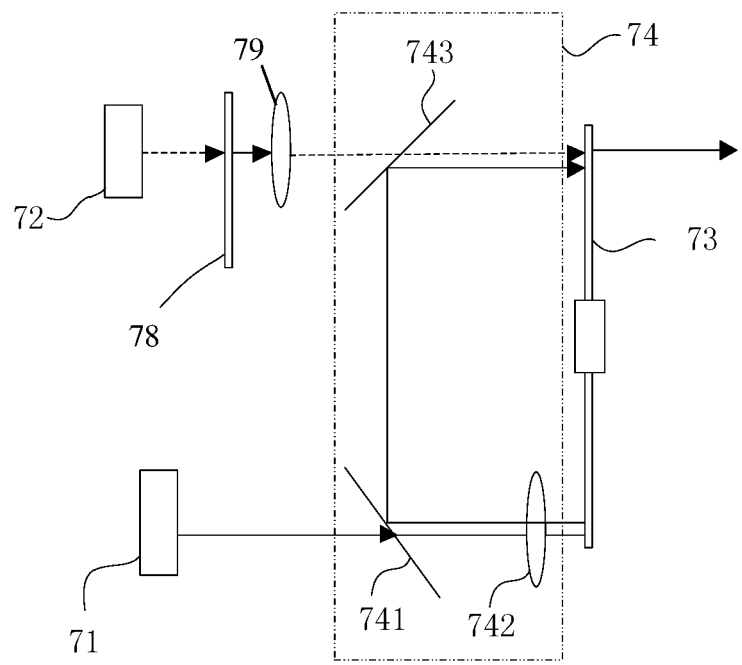
FIG. 23 schematically illustrates the structure of a light emitting device according to a sixth embodiment of the present invention.

FIG. 23 schematically illustrates the structure of a light emitting device according to another embodiment of the present invention. The light emitting device includes two light sources, which are an excitation light source 71 emitting and excitation light and a compensation light source 72 emitting a compensation light which has a different spectrum than that of the excitation light, and a wavelength conversion device 73.

The wavelength conversion device 73 is disposed on the transmission paths of the excitation light emitted by the excitation light source 71 and the compensation light emitted by the compensation light source 72. It includes at least two segments arranged in the circumferential direction, where at least one of the at least two segments has a wavelength conversion layer. When the excitation light source 71 and compensation light source 72 simultaneously illuminate different segments of the wavelength conversion device 73, the wavelength conversion device 73 outputs a combined light of the compensation light and a converted light. The compensation light has spectral overlap with the converted light. The wavelength conversion device 73 is a reflection type wavelength conversion device.

In a preferred embodiment, at least one segment of the at least two segments has a second diffuser.

When the excitation light source 71 and compensation light source 72 simultaneously illuminate different segments of the wavelength conversion device 73, the process of generating the combined light of the compensation light and a converted light is as follows:

The excitation light source 71 is continuously turned on. The compensation light source 72 is turned on when the segment of the wavelength conversion device 73 having the wavelength conversion layer is in the transmission path of the excitation light source 71, and turned off during other segments. Thus, the wavelength conversion device outputs a combined light of the compensation light and the converted light.

In this embodiment, the light emitting device further includes a light combination device 74. The light combination device 74 includes a first light combination plate 741, a collection lens 742 and a second light combination plate 743. The excitation light emitted by the excitation light source 71 is transmitted through the first light combination plate 741, and collected by the collection lens 742 to be input to the wavelength conversion device 73. The compensation light source 72 is transmitted through the second light combination plate 743 to be input to the wavelength conversion device 73. The output light of the wavelength conversion device 73 is collected by the collection lens 742 onto the first light combination plate 741, reflected by the first light combination plate 741 to the second light combination plate 743, and then reflected by the second light combination plate 743 where it is combined with the compensation light that is transmitted through the second light combination plate 743 to form one light beam. The first light combination plate 741 may be a partially coated filter, which includes a transmission portion and a reflection portion. The transmission portion transmits the excitation light emitted by the excitation light source, and the reflection portion reflects the light beam output from the wavelength conversion device. To reduce light loss, the size of the transmission portion is smaller than the size of the reflection portion.

To avoid having the compensation light directly output by the wavelength conversion device, which causes speckle, and also to reduce light loss, in a preferred embodiment, a scattering device 78 and a collection lens 79 are provided on the optical path between the compensation light emitted by the compensation light source 72 and the wavelength conversion device. The scattering device 78 has a first diffuser, for scattering the compensation light. The collection lens 79 collects the compensation light scattered by the scattering device 78, and relays it to the wavelength conversion device 73. This way, the second light combination plate 743 may also be a partially coated filter, which includes a transmission portion and a reflection portion. The transmission portion transmits the compensation light, which has been scattered by the scattering device 78 and collected by the collection lens 79, to the wavelength conversion device 73. The reflection portion reflects the light beam from the first light combination plate 741 to the wavelength conversion device 73.

Figure 24:
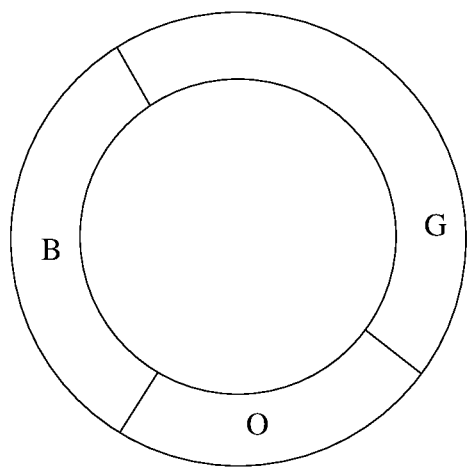
FIG. 24 schematically illustrates the arrangement of segments of the wavelength conversion device shown in FIG. 23 according to an embodiment of the present invention.

Refer to FIG. 24, which schematically illustrates the arrangement of segments of the wavelength conversion device 73 shown in FIG. 23 according to an embodiment of the present invention. The arrangement of the segments of the wavelength conversion device 73 is not limited to that shown in FIG. 24.

The wavelength conversion device 73 includes, arranged along the circumferential direction, a segment having the second diffuser (the blue segment B in FIG. 24), a segment having the green wavelength conversion layer (the green segment G in FIG. 24), and a segment having the orange wavelength conversion layer (the orange segment O in FIG. 24).

In one example, the excitation light source 71 is a blue light source, such as a blue laser or blue LED, and the compensation light source 72 is a red laser source. The excitation light source 71 is continuously turned on. The compensation light source 72 is turned on when the segment of the wavelength conversion device 73 having the orange wavelength conversion layer is in the transmission path of the excitation light source 71, and turned off during other times. Thus, the wavelength conversion device 73 outputs a combined light of the red laser light and the orange light, which increases the utilization efficiency of the orange light and brightness.

In another example, the excitation light source 71 is a blue light source, such as a blue laser or blue LED, and the compensation light source 72 is a green laser source, such as a laser having a dominant wavelength of 510 nm to 530 nm. The excitation light source 71 is continuously turned on. The compensation light source 72 is turned on when the segment of the wavelength conversion device 73 having the green wavelength conversion layer is in the transmission path of the excitation light source 71, and turned off during other times. Thus, the wavelength conversion device 73 outputs a combined light of the green laser light and the green light, which increases the utilization efficiency of the green light and brightness.

In another embodiment, the light emitting device further includes a third light source (not shown in FIG. 23). The third light source emits a third light. The third light has a different spectrum than the compensation light. The third light has the same color as but different spectrum than the excitation light. For example, the excitation light is a blue laser light of 445 nm, the third light is a blue laser light of 462 nm. The third light emitted by the third light source is combined with the excitation light, and input to the wavelength conversion device via the light combination device.

In this embodiment, the excitation light source is turned on during the segments having the wavelength conversion layers, and turned off during other segments. The compensation light source is turned on when the segment of the wavelength conversion device having the first wavelength conversion layer is located on the transmission path of the excitation light source, and turned off during other segments. The third light source is turned on during the segment having the second diffuser, and turned off during other segments. Thus, the wavelength conversion device outputs a light sequence that includes the third light, the converted light and the compensation light, so that the third light may be used as one of the primary color lights output by the light emitting device.

Fourteenth Embodiment

Figure 25:
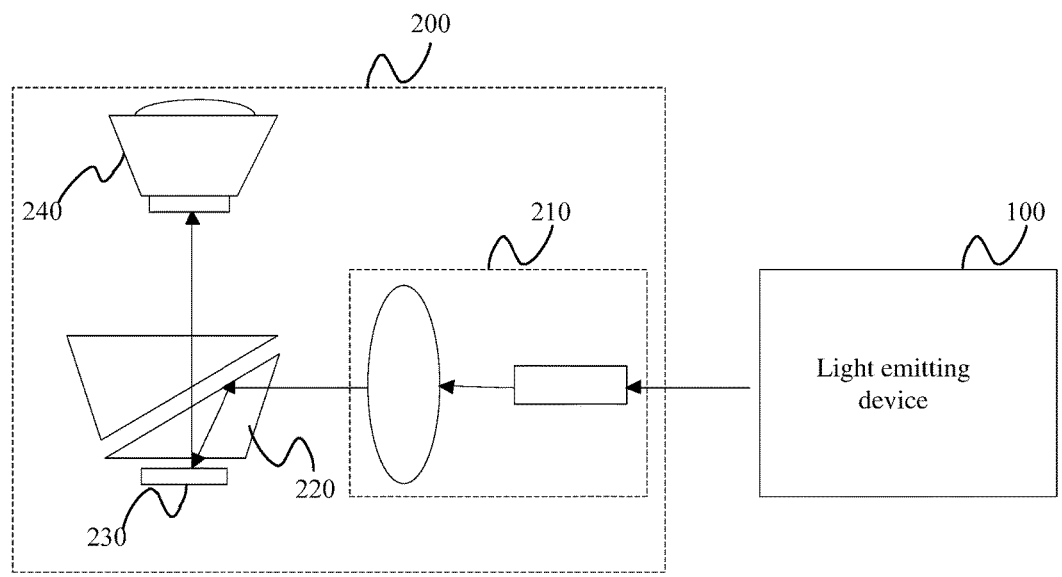
FIG. 25 schematically illustrates the structure of a projection system according to an embodiment of the present invention.

FIG. 25 schematically illustrates the structure of a projection system according to an embodiment of the present invention. The projection system includes a light emitting device 100 as those described in earlier embodiments, and a first image forming assembly 200. The first image forming assembly 200 includes a light relay 210, a TIR prism 220, a spatial light modulator 230, and a projection lens 240. The light relay 210 may include a light rod, relay lens, etc. The spatial light modulator 230 includes a digital micromirror device (DMD). The light relay 210 relays the light outputted by the light emitting device 100 to the TIR prism 220; the TIR prism 220 guides this light to the DMD, and guides the image light outputted by the DMD to the projection lens 240.

Fifteenth Embodiment

Figure 26:
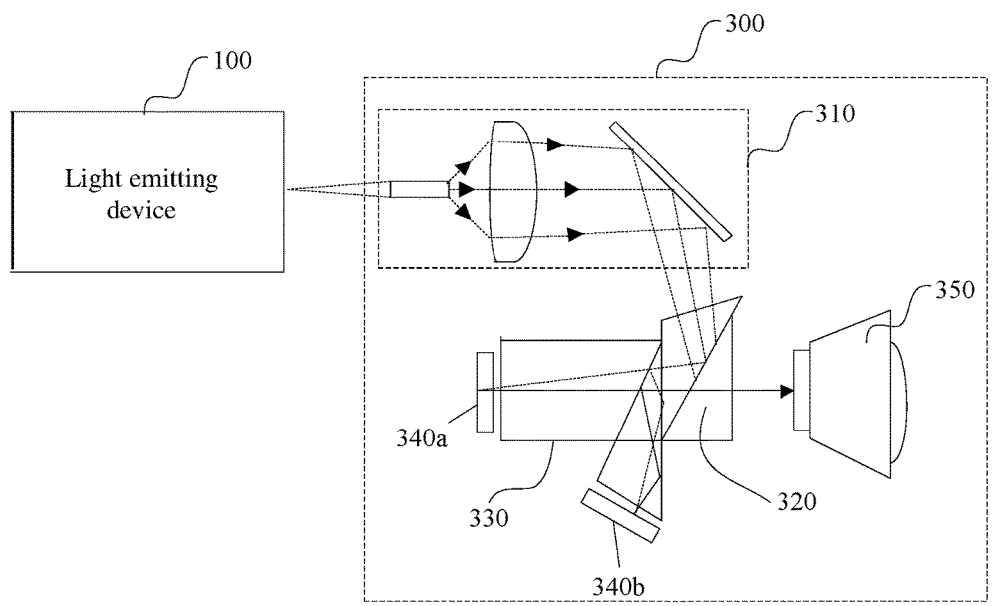
FIG. 26 schematically illustrates the structure of a projection system according to an embodiment of the present invention.

FIG. 26 schematically illustrates the structure of a projection system according to another embodiment of the present invention. The projection system includes a light emitting device 100 as those described in earlier embodiments, and a second image forming assembly 300. The second image forming assembly 300 includes a light relay 310, a TIR prism 320, a light separation and combination prism 330, a spatial light modulator including first DMD 340*a* and second DMD 340*b*, and a projection lens 350. The light relay 310 may include a light rod, relay lens, etc. The light separation and combination prism 330 includes a first prism and a second prism, and a light splitting coating because the first prism and the second prism. The light splitting coating is a low-pass light splitting coating or a bandpass light splitting coating.

The light relay 310 relays the light outputted by the light emitting device 100 to the TIR prism 320. The TIR prism 320 guides the light from the light relay 310 to the light separation and combination prism 330. The light separation and combination prism 330 splits the light from the TIR prism 320 into a light traveling along a first optical path and a light traveling along a second optical path. The first DMD 340*a* modulates the light traveling along the first optical path to obtain a first image light, and the second DMD 340*b* modulates the light traveling along the second optical path to obtain a second image light. The light separation and combination prism 330 combines the first image light and the second image light, and the TIR prism 320 guides the combined light to the projection lens 350.

The embodiments of the present invention are described above. These embodiments do not limit the scope of the invention. Various modification and variations can be made in the systems and related method of the present invention, and the principles described here can be realized in other embodiments without departing from the spirit or scope of the invention. Thus, it is intended that the present invention cover modifications and variations that come within the scope of the appended claims and their equivalents.

What is claimed is:

1. A light emitting device, comprising:
an excitation light source for generating an excitation light;
a compensation light source for generating a compensation light having a spectral range different from a spectral range of the excitation light; and
a wavelength conversion device, disposed on transmission paths of both the excitation light and the compensation light, wherein the wavelength conversion device outputs a light sequence under alternating illumination of the excitation light source and the compensation light source, the light sequence including at least one converted light and the compensation light, wherein the compensation light has spectral overlap with at least one converted light of the at least one converted light;
wherein the wavelength conversion device includes at least two segments arranged along a circumferential direction, wherein at least one of the at least two segments includes a first diffuser, and at least one of remaining ones of the at least two segments includes the wavelength conversion layer,
wherein the wavelength conversion device is one that includes both a transmission region and a reflection region, the segment having the first diffuser is located in the transmission region of the wavelength conversion device.

2. The light emitting device of claim 1, wherein at least one of the at least two segments includes a second diffuser.

3. A light emitting device, comprising:
an excitation light source for generating an excitation light;
a compensation light source for generating a compensation light having a spectral range different from a spectral range of the excitation light; and
a wavelength conversion device, disposed on transmission paths of both the excitation light and the compensation light, wherein the wavelength conversion device outputs a light sequence under alternating illumination of the excitation light source and the compensation light source, the light sequence including at least one converted light and the compensation light, wherein the compensation light has spectral overlap with at least one converted light of the at least one converted light;
wherein the wavelength conversion device includes at least three segments arranged along a circumferential direction, the at least three segments including a first diffuser, a second diffuser, and the wavelength conversion layer,
wherein the compensation light source includes a first compensation light source generating a first compensation light, wherein the wavelength conversion layer includes a first wavelength conversion layer which generates a first converted light when illuminated by the excitation light, wherein the light sequence includes the first compensation light and the first converted light, and wherein the first compensation light has spectral overlap with the first converted light.

4. The light emitting device of claim 3, wherein the wavelength conversion device is a transmission type wavelength conversion device, a reflection type wavelength conversion device, or a wavelength conversion device that includes both a transmission region and a reflection region.

5. The light emitting device of claim 3,
wherein the first compensation light source is turned on when the at least one segment of the wavelength conversion device having the first diffuser is located on a transmission path of the first compensation light source, and is turned off when other segments are located on the transmission path of the first compensation light source; and
wherein the excitation light source is turned on when the segment of the wavelength conversion device having the wavelength conversion layer is located on the transmission path of the excitation light source, and is turned off when the segment having the first diffuser is located on the transmission path of the excitation light source.

6. The light emitting device of claim 5,
wherein the excitation light source is turned on when the segment of the wavelength conversion device having the second diffuser is located on the transmission path of the excitation light source; or
wherein the light emitting device further includes a third light source for generating a third light, wherein the third light has a same color as but a different spectrum than the excitation light, and wherein third light source is turned on when the segment of the wavelength conversion device having the second diffuser is located on the transmission path of the third light source, and is turned off when other segments are located on the transmission path of the third light source.

7. The light emitting device of claim 6, wherein the first compensation light source is a red laser source, and wherein the first wavelength conversion layer is an orange wavelength conversion layer.

8. The light emitting device of claim 7, wherein the wavelength conversion layer further includes a green wavelength conversion layer.

9. The light emitting device of claim 8, wherein the wavelength conversion layer further includes a yellow wavelength conversion layer.

10. The light emitting device of claim 9, wherein the wavelength conversion device includes eight segments arranged along the circumferential direction, which are respectively a segment having the second diffuser, a segment having the green wavelength conversion layer, a segment having the yellow wavelength conversion layer, a segment having the orange wavelength conversion layer, another segment having the second diffuser, another segment having the green wavelength conversion layer, another segment having the yellow wavelength conversion layer, and a segment having the first diffuser.

11. The light emitting device of claim 8, wherein the wavelength conversion device includes six segments arranged along the circumferential direction, which are respectively a segment having the second diffuser, a segment having the green wavelength conversion layer, a segment having the orange wavelength conversion layer, another segment having the second diffuser, another segment having the green wavelength conversion layer, and a segment having the first diffuser.

12. The light emitting device of claim 3,
wherein the compensation light source further includes a second compensation light source generating a second compensation light which has a different spectral range than that of the first compensation light,
wherein the wavelength conversion layer further includes a second wavelength conversion layer which generates a second converted light when illuminated by the excitation light, the second converted light having a different spectral range than that of the first converted light, wherein the light sequence further includes the second compensation light and the second converted light, and wherein the second compensation light has spectral overlap with the second converted light.

13. The light emitting device of claim 12, wherein the second compensation light source is turned on when the at least one segment of the wavelength conversion device having the first diffuser is located on a transmission path of the second compensation light source, and is turned off when other segments are located on the transmission path of the second compensation light source.

14. The light emitting device of claim 13, wherein the turning-on time sequence of the second compensation light source is different from the turning-on time sequence of the first compensation light source.

15. The light emitting device of claim 14, wherein the second compensation light source is a blueish-green laser source, and the second wavelength conversion layer is a green wavelength conversion layer.

16. A projection device, comprising the light emitting device of claim 3, further comprising a first image forming assembly, wherein the first image forming assembly includes a light relay, a TIR prism, a spatial light modulator, and a projection lens.

17. A projection device, comprising the light emitting device of claim 3, further comprising a second image forming assembly, wherein the second image forming assembly includes a light relay, a TIR prism, a light separation and combination prism, a spatial light modulator including a first digital micromirror device and a second digital micromirror device, and a projection lens;
    wherein the light separation and combination prism splits the light from the light emitting device into a light traveling along a first optical path and a light traveling along a second optical path, the first optical path being different from the second optical path,
    wherein the first digital micromirror device modulates the light traveling along the first optical path to obtain a first image light,
    wherein the second digital micromirror device modulates the light traveling along the second optical path to obtain a second image light, and
    wherein the light separation and combination prism combines the first image light and the second image light, and wherein the TIR prism guides the combined light to the projection lens.

18. A light emitting device, comprising:
    an excitation light source for generating an excitation light;
    a compensation light source for generating a compensation light having a spectral range different from a spectral range of the excitation light;
    a wavelength conversion device disposed on transmission paths of both the excitation light and the compensation light, the wavelength conversion device including at least two segments, wherein when the excitation light source and the compensation light source simultaneously illuminate different segments of the wavelength conversion device, the wavelength conversion device outputs a combined light of the compensation light and a converted light, wherein the compensation light has spectral overlap with the converted light,
    wherein at least one of the at least two segments includes a wavelength conversion layer, and at least one of remaining ones of the at least two segments includes a second diffuser,
    wherein the wavelength conversion device includes a segment having the second diffuser, a segment having a green wavelength conversion layer, and a segment having an orange wavelength conversion layer, arranged along a circumferential direction.

19. The light emitting device of claim 18, wherein the excitation light source is continuously turned on, wherein the compensation light source is turned on when the segment of the wavelength conversion device having the first wavelength conversion layer is located on a transmission path of the excitation light source, and is turned off when other segments are located on the transmission path of the excitation light source, wherein the first wavelength conversion layer converts the excitation light to a converted light that has spectral overlap with the compensation light.

* * * * *